United States Patent
Abouelseoud

(10) Patent No.: US 11,601,994 B2
(45) Date of Patent: Mar. 7, 2023

(54) UNASSIGNED SLOTS ANNOUNCEMENT IN TDD SP CHANNEL ACCESS WLAN NETWORKS

(71) Applicant: SONY CORPORATION, Tokyo (JP)

(72) Inventor: Mohamed Abouelseoud, San Francisco, CA (US)

(73) Assignee: SONY CORPORATION, Tokyo (JP)

( * ) Notice: Subject to any disclaimer, the term of this patent is extended or adjusted under 35 U.S.C. 154(b) by 227 days.

(21) Appl. No.: 16/925,623

(22) Filed: Jul. 10, 2020

(65) Prior Publication Data

US 2020/0413461 A1 Dec. 31, 2020

Related U.S. Application Data

(63) Continuation of application No. 16/203,185, filed on Nov. 28, 2018, now Pat. No. 10,743,356.
(Continued)

(51) Int. Cl.
*H04W 72/02* (2009.01)
*H04W 72/04* (2009.01)
(Continued)

(52) U.S. Cl.
CPC .......... *H04W 76/14* (2018.02); *H04B 17/336* (2015.01); *H04L 5/1469* (2013.01);
(Continued)

(58) Field of Classification Search
None
See application file for complete search history.

(56) References Cited

U.S. PATENT DOCUMENTS 6,504,837 B1 1/2003 Menzel
7,333,458 B2 2/2008 Cain
(Continued)

FOREIGN PATENT DOCUMENTS

CN 107949057 A 4/2018
JP 2012138951 A 7/2012
(Continued)

OTHER PUBLICATIONS

ISA/EP, European Patent Office, International Search Report and Written Opinion dated Dec. 12, 2019, related PCT international application No. PCT/IB2019/056658, pp. 1-15, claims searched, pp. 16-21.
(Continued)

*Primary Examiner* — Duc T Duong
(74) *Attorney, Agent, or Firm* — O'Banion & Ritchey LLP; John P. O'Banion

(57) ABSTRACT

A wireless communication apparatus, system or method utilizing directional data transmission over a communication (e.g., mmW) band, and broadcasting time and directional allocations in each direction. Stations transmit beacons containing time, directional allocations and unallocated slots in their direction of transmission. Stations comparing beam identifications with received allocation to determine if the allocation is in the direction of reception. Stations performing receiver beamforming with a station from which a beacon was received in order to determine if the station can access the direction (channel) in its intended direction.

25 Claims, 18 Drawing Sheets

Related U.S. Application Data

(60) Provisional application No. 62/719,787, filed on Aug. 20, 2018.

(51) Int. Cl.
*H04W 74/08* (2009.01)
*H04W 76/11* (2018.01)
*H04W 48/16* (2009.01)
*H04B 17/336* (2015.01)
*H04L 5/14* (2006.01)
*H04W 76/14* (2018.01)
*H04W 72/0446* (2023.01)
*H04W 84/18* (2009.01)
*H04W 84/12* (2009.01)

(52) U.S. Cl.
CPC ....... *H04W 48/16* (2013.01); *H04W 72/0446* (2013.01); *H04W 76/11* (2018.02); *H04W 84/12* (2013.01); *H04W 84/18* (2013.01)

(56) References Cited

U.S. PATENT DOCUMENTS

| | | | |
|---|---|---|---|
| 9,258,046 B2 | 2/2016 | Sinha | |
| 9,295,033 B2 | 3/2016 | Quan | |
| 10,123,187 B2 | 11/2018 | Wu | |
| 10,743,356 B2 | 8/2020 | Abouelseoud | |
| 2002/0067709 A1 | 6/2002 | Yamada | |
| 2003/0176193 A1 | 9/2003 | Konishi | |
| 2004/0081121 A1 | 4/2004 | Guanghan | |
| 2011/0065448 A1 | 3/2011 | Song | |
| 2014/0086112 A1* | 3/2014 | Stern-Berkowitz | H04L 1/1854 370/280 |
| 2014/0362701 A1 | 12/2014 | Roh | |
| 2015/0173069 A1 | 6/2015 | Cucala Garcia | |
| 2017/0013641 A1 | 1/2017 | Patel | |
| 2018/0115996 A1 | 4/2018 | Si | |
| 2018/0206268 A1 | 7/2018 | Abdallah | |
| 2018/0279348 A1 | 9/2018 | Huang | |
| 2019/0004520 A1 | 1/2019 | Maeno | |
| 2019/0045520 A1* | 2/2019 | Venkatachalam Jayaraman | H04W 72/0446 |
| 2019/0059001 A1 | 2/2019 | Yerramalli | |
| 2019/0246302 A1* | 8/2019 | Park | H04W 24/10 |
| 2019/0261417 A1* | 8/2019 | Chen | H04L 5/14 |
| 2019/0268972 A1* | 8/2019 | Chen | H04L 5/0064 |
| 2020/0092812 A1* | 3/2020 | Bang | H04W 52/0229 |
| 2020/0162878 A1* | 5/2020 | Zhuang | H04W 4/06 |

FOREIGN PATENT DOCUMENTS

| | | |
|---|---|---|
| JP | 2016524377 A | 8/2016 |
| WO | WO-2014179575 A2 | 11/2014 |
| WO | 2018049224 A1 | 3/2018 |

OTHER PUBLICATIONS

The 801.11 Working Group of the Lan/Man Standards Committee of the IEEE Computer Society, "P802.11ay/D1.0, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt band above 45 GHz", IEEE P082.11ay/D1.0, Nov. 2017, 490 pages.

Cordeiro, Carlos (Intel) et al., "IEEE P802.11 Wireless LANs, Draft text for Scheduling for mmWave Distribution Networks", doc.: IEEE 802.11-17/1640r0, Nov. 7, 2017, pp. 1-8.

Cheng Chen (Intel), Draft text for Scheduling for mmWave Distribution Networks[online], IEEE 802.11-17/1640r0, IEEE, Internet<URL: https://mentor.ieee.org/802.11/dcn/17/11-17-1640-00-00ay-draft-text-for-scheduling-for-mmwave-distribution-networks.docx>, Nov. 6, 2017.

Mohamed Abouelseoud (Sony), TDD-SP Coexistence[online], IEEE 802.11-18/1586r0, IEEE, Internet<URL: https://mentor.ieee.org/802.11/dcn/18/11-18-1586-00-00ay-tdd-sp-coexistence.pptx>, Dec. 9, 2018.

* cited by examiner

| Element ID | Length | Active Path Selection Protocol Identifier | Active Path Selection Metric Identifier | Congestion Control Mode Identifier | Synchronization Method Identifier | Authentication Protocol Identifier | Mesh Formation Info | Mesh Capability |
|---|---|---|---|---|---|---|---|---|
| 1 | 1 | 1 | 1 | 1 | 1 | 1 | 1 | 1 |

Octets:

FIG. 4
(Prior Art)

| Frame control | Duration | RA | TA | SSW | SSW Feedback | FCS |
|---|---|---|---|---|---|---|
| 2 | 2 | 6 | 6 | 3 | 3 | 4 |

Octets:

FIG. 7
(Prior Art)

| B0 | B1  B9 | B10  B15 | B16  B17 | B18  B23 |
|---|---|---|---|---|
| Direction | CDOWN | Sector ID | DMG Antenna ID | RXSS Length |
| 1 | 9 | 6 | 2 | 6 |

Bits:

FIG. 8
(Prior Art)

| B0  B8 | B9  B10 | B11  B15 | B16 | B17  B23 |
|---|---|---|---|---|
| Total sectors in ISS | Number of RX DMG antennas | Reserved | Poll Required | Reserved |
| 9 | 2 | 5 | 1 | 7 |

Bits:

FIG. 9A
(Prior Art)

| B0  B5 | B6  B7 | B8  B15 | B16 | B17  B23 |
|---|---|---|---|---|
| Sector select | DMG Antenna select | SNR report | Poll Required | Reserved |
| 6 | 2 | 8 | 1 | 7 |

Bits:

FIG. 9B
(Prior Art)

UNASSIGNED SLOTS ANNOUNCEMENT IN TDD SP CHANNEL ACCESS WLAN NETWORKS

CROSS-REFERENCE TO RELATED APPLICATIONS

This application is a continuation of U.S. patent application Ser. No. 16/203,185 filed on Nov. 28, 2018, incorporated herein by reference in its entirety, which claims priority to, and the benefit of, U.S. provisional patent application Ser. No. 62/719,787 filed Aug. 20, 2018, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to directional millimeter wave (mmW) wireless network communications, and more particularly to the distribution of time and directional allocation information.

2. Background Discussion

Wireless local area networks (WLANs), such as in the Millimeter wave (mmW) regime including mesh networks and mixtures of mesh and non-mesh networks, are becoming increasingly important, especially in the millimeter wavelength (mm-Wave or mmW) regimes. In response to the need of higher capacity, network operators have begun to embrace various concepts to achieve densification. Current sub-6 GHz wireless technology is not sufficient to cope with high data demands. One alternative is to utilize additional spectrum in the 30-300 GHz band which is often referred to as the millimeter wave band (mmW).

Efficient use of mmW wireless networking systems generally requires properly dealing with channel impairments and propagation characteristics of these high frequency bands. High free-space path loss, high penetration, reflection and diffraction losses reduce available diversity and limit non-line-of-sight (NLOS) communications. Yet, the small wavelength of mmW enables the use of high-gain electronically steerable directional antennas of practical dimensions, which can provide sufficient array gain to overcome path loss and ensure a high Signal-to-Noise Ratio (SNR) at the receiver. Directional distribution networks (DNs) in dense deployment environments using mmW bands could be an efficient way for achieving reliable communications between stations (STAs) and overcoming line-of-sight channel restrictions.

Upon a new station (STA or node) starting up in a location it will be looking (searching) for neighboring STAs to discover in a network to be joined. The process of initial access of a STA to a network comprises scanning for neighboring STAs and discovering all active STAs in the local vicinity. This can be performed either through the new STA searching for a specific network or list of networks to join, or by the new STA sending a broadcast request to join any already established network that will accept the new STA.

A STA connecting to a distributed network (DN) needs to discover neighboring STAs to decide on the best way to reach a gateway/portal DN STAs and the capabilities of each of these neighboring STAs. The new STA examines every channel for possible neighboring STAs over a specific period of time. If no active STA is detected after that specific time, the new STA moves to test the next channel. When a STA is detected, the new STA collects sufficient information to configure its physical (PHY) layer (e.g., OSI model) for operation in the regulatory domain (IEEE, FCC, ETSI, MKK, etc.). This task is further challenging in mmWave communications due to directional transmissions. The challenges in this process can be summarized as: (a) knowledge of surrounding STAs IDs; (b) knowledge of the best transmission pattern(s) for beamforming; (c) channel access issues due to collisions and deafness; and (d) channel impairments due to blockage and reflections. Designing a neighborhood discovery method to overcome some or all of the above is of utmost importance to enable pervasiveness of mmWave D2D and DN technologies.

In present mmWave communication systems, STAs using TDD SP channel access have no requirement to listen to the channel before using it, which can create issues for other stations trying to fairly access the channel. These other STAs trying to access the channel might be blocked since they are required to sense the medium before using the channel, while the TDD SP Stations are not required to do so. In addition, the present techniques for sensing the medium are subject to false indications of interference.

Accordingly, a need exists for enhanced mechanisms for providing more efficient use of unassigned time slots during TDD SP channel access within a mmWave directional wireless network. The present disclosure fulfills that need and provides additional benefits over previous technologies.

BRIEF SUMMARY

A wireless protocol is described for directional mmW wireless stations to broadcast a report of the unassigned slots by the STA when it is using TDD SP channel access in the direction of transmission, or in all directions. The STA deploying TDD SP channel access informs other STAs in the surrounding area about the allocation in the direction of transmission or the spectrum allocation across all directions. Other STAs receiving this information can determine the time slots when the channel is unoccupied during TDD SP transmission, and the directions where interference is a threat, as well as the directions where the sensed signal is not a threat.

The wireless directional system disclosed is applicable to a wide range of network applications, for example device-to-device (D2D), peer-to-peer (P2P), wireless and mesh networking applications which can be applied to wireless LAN (WLAN), wireless personal area networks (WPAN), and outdoor wireless communications. The target applications for example include, but are not limited to, Wi-Fi, WiGig, and other wireless networks, Internet of things (IoT) applications, backhauling and fronthaul of data, indoor and outdoor distribution networks, mesh networks, next generation cellular networks with D2D communications, and numerous other applications as will be readily recognized by one of ordinary skill in the art.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 4 is a data field diagram depicting a DN configuration element for an IEEE 802.11 WLAN.

FIG. 7 is a data field diagram depicting a sector sweep (SSW) frame element for IEEE 802.11ad.

FIG. 8 is a data field diagram depicting the SSW field within the SSW frame element for IEEE 802.11ad.

FIG. 9A and FIG. 9B are data field diagrams depicting SSW feedback fields shown when transmitted as part of an ISS in FIG. 9A, and when not transmitted as part of an ISS in FIG. 9B, as utilized for IEEE 802.11ad.

DETAILED DESCRIPTION

Figure 1:
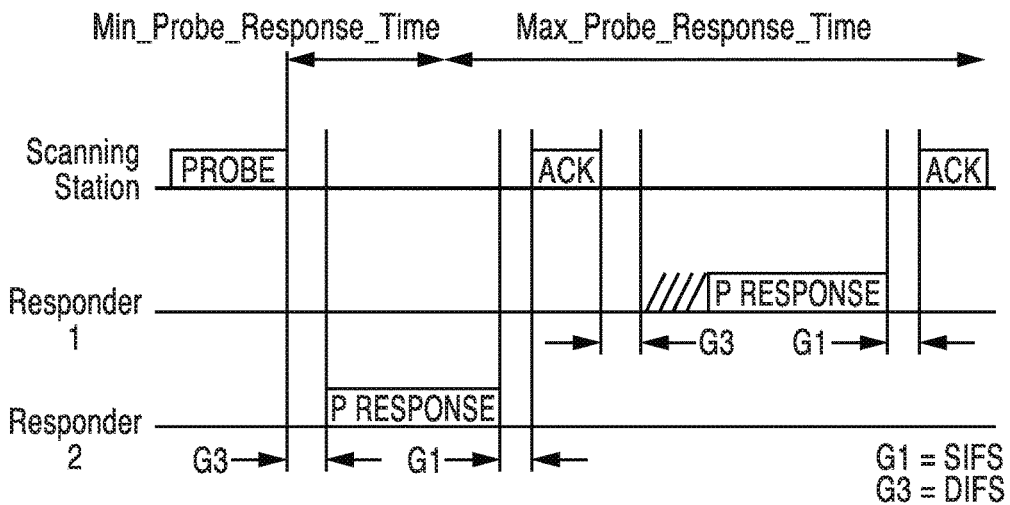
FIG. 1 is a timing diagram of active scanning performed in an IEEE 802.11 wireless local area network (WLAN).

When used in this disclosure the following terms have the meanings generally described below.

A-BFT: Association-Beamforming Training period; a period announced in the beacons that is used for association and beamform (BF) training of new stations (STAs) joining the network.

AP: Access Point; an entity that contains one station (STA) and provides access to the distribution services, through the wireless medium (WM) for associated STAs.

Beamforming (BF): a directional transmission from a directional antenna system or array, and not an omni-directional or quasi-omni antenna, for determining information for improving received signal power or signal-to-noise ratio (SNR) at the intended receiver, and under which stations can obtain information for correlating time and directional allocation information.

BSS: Basic Service Set is a set of stations (STAs) that have successfully synchronized with an AP in the network.

BI: the Beacon Interval is a cyclic super frame period that represents the time between beacon transmission times.

BRP: BF Refinement protocol is a BF protocol that enables receiver training and iteratively trains transmitter and receiver sides to optimize (achieve the best possible) directional communications.

BSS: Basic Service Set, is a component of the IEEE 802.11 WLAN architecture, built around a BSS which is actually a set of STAs connecting to the wireless medium allowing the STAs to communicate with each other.

BTI: Beacon Transmission Interval is the interval between successive beacon transmissions.

CBAP: Contention-Based Access Period is the time period within the data transfer interval (DTI) of a directional multi-gigabit (DMG) BSS where contention-based enhanced distributed channel access (EDCA) is utilized.

CCA: Clear Channel Assessment is a wireless carrier sense mechanism defined in IEEE 802.11.

DMG: Directional Multi-Gigabit is a form of high throughput wireless communications described in IEEE 802.

EDMG: Extended Directional Multi-Gigabit

DTI: Data Transfer Interval is the period in which full BF training is permitted followed by actual data transfer. The DTI can include one or more service periods (SPs) and contention-based access periods (CBAPs).

LOS: Line-of-Sight, a communication in which the transmitter and receiver are ostensibly within sight of one another, and not the result of communication of a reflected signal; the opposite condition is NLOS for non-line-of-sight in which stations are not in LOS of one another.

MAC address: a Medium Access Control (MAC) address.

MBSS: Mesh Basic Service Set is a basic service set (BSS) that forms a self-contained network of distributed network (DN) Stations (DN STAs) which may be used as a distribution system (DS).

MCS: Modulation and Coding Scheme; defines an index that can be translated into the physical (PHY) layer (e.g., OSI model) data rate.

MSTA: Mesh station (MSTA) is a station (STA) that implements the Mesh facility, and when it operates in the Mesh BSS it may provide the distribution services for other MSTAs.

DN STA: distributed network (DN) station (DN STA) is a station (STA) that implements the DN facility. A DN STA that operates in the DN BSS may provide the distribution services for other DN STAs.

Omni-directional: a mode of transmission utilizing a non-directional antenna.

Quasi-omni directional: is a mode of communication utilizing a directional multi-gigabit (DMG) antenna with the widest beamwidth attainable.

Receive sector sweep (RXSS): Reception of Sector Sweep (SSW) frames via (across) different sectors, in which a sweep is performed between consecutive receptions.

RSSI: receive signal strength indicator (in dBm).

SLS: Sector-level Sweep phase is a BF training phase that can include as many as four components: an Initiator Sector Sweep (ISS) to train the initiator, a Responder Sector Sweep (RSS) to train the responder link, such as using SSW Feedback and an SSW ACK.

SNR: received Signal-to-Noise Ratio in dB.

SP: Service Period is the time period that is scheduled by the access point (AP), with scheduled SPs starting at fixed intervals of time.

Spectral efficiency: the information rate that can be transmitted over a given bandwidth in a specific communication system, usually expressed in bits per second, or in Hertz.

SSID: service Set Identifier is the name assigned to a WLAN network.

STA: Station is a logical entity that is a singly addressable instance of a medium access control (MAC) and physical layer (PHY) interface to the wireless medium (WM).

Sweep: a sequence of transmissions, separated by a short beamforming interframe space (SBIFS) interval, in which the antenna configuration at the transmitter or receiver is changed between transmissions.

SSW: Sector Sweep, is an operation in which transmissions are performed in different sectors (directions) and information collected on received signals, strengths and so forth.

TDD: Time Division Duplex allows the communication link to be duplexed, in which uplink is separated from downlink by the allocation of different time slots in the same frequency band, to adjust for different uplink and downlink data transmission flows.

TDD SP: Time Division Duplexing Service Period is a service period with TDD channel access, in which the TDD SP comprises a sequence of TDD intervals that, in turn, comprise a sequence of TDD slots.

Transmit Sector Sweep (TXSS): is transmission of multiple Sector Sweep (SSW) or Directional Multi-gigabit (DMG) Beacon frames via different sectors, in which a sweep is performed between consecutive transmissions.

1. Existing Directional Wireless Network Technology

1.1. WLAN Systems

In WLAN systems, such as 802.11, there are defined two modes of scanning; passive and active scanning. The following are the characteristics of passive scanning. (a) A new station (STA) attempting to join a network, examines each channel and waits for beacon frames for up to MaxChannelTime. (b) If no beacon is received, then the new STA moves to another channel, thus saving battery power since the new STA does not transmit any signal in scanning mode. The STA should wait enough time at each channel so that it does not miss the beacons. If a beacon is lost, the STA should wait for another beacon transmission interval (BTI).

The following are the characteristics of active scanning. (a) A new STA wanting to join a local network sends probe request frames on each channel, according to the following. (a)(1) The new STA moves to a channel, waits for incoming frames or a probe delay timer to expire. (a)(2) If no frame is detected after the timer expires, the channel is considered to not be in use. (a)(3) If a channel is not in use, the STA moves to a new channel. (a)(4) If a channel is in use, the STA gains access to the medium using regular DCF and sends a probe request frame. (a)(5) The STA waits for a desired period of time (e.g., Minimum Channel Time) to receive a response to the probe request if the channel was never busy. The STA waits for more time (e.g., Maximum Channel Time) if the channel was busy and a probe response was received.

(b) A Probe Request can use a unique service set identifier (SSID), list of SSIDs or a broadcast SSID. (c) Active scanning is prohibited in some frequency bands. (d) Active scanning can be a source of interference and collision, especially if many new STAs arrive at the same time and are attempting to access the network. (e) Active scanning is a faster way (less delay) for STAs to gain access to the network compared to the use of passive scanning, since STAs do not need to wait for beacons. (f) In the infrastructure basic service set (BSS) and IBSS, at least one STA is awake to receive and respond to probes. (g) STAs in a distributed network (DN) basic service set (MBSS) might not be awake at any point of time to respond. (h) When radio measurement campaigns are active, STAs might not answer the probe requests. (i) Collision of probe responses can arise. STAs might coordinate the transmission of probe responses by allowing the STA that transmitted the last beacon to transmit the first Probe Response. Other STAs can follow and use back-off times and regular distributed coordination function (DCF) channel access to avoid collision.

FIG. 1 depicts the use of active scanning in an IEEE 802.11 WLAN, depicting a scanning station sending a probe and two responding stations which receive and respond to the probe. The figure also shows the minimum and maximum probe response timing. The value G1 is shown set to SIFS which is the interframe spacing prior to transmission of an acknowledgment, while value G3 is DIFS which is DCF interframe spacing, represented the time delay for which a sender waits after completing a backoff period before sending an RTS package.

1.2. IEEE 802.11s Distributed Network (DN) WLAN

IEEE 802.11s (hereafter 802.11s) is a standard that adds wireless mesh networking capabilities to the 802.11 standard. In 802.11s new types of radio stations are defined as well as new signaling to enable mesh network discovery, establishing peer-to-peer connection, and routing of data through the mesh network.

Figure 2:
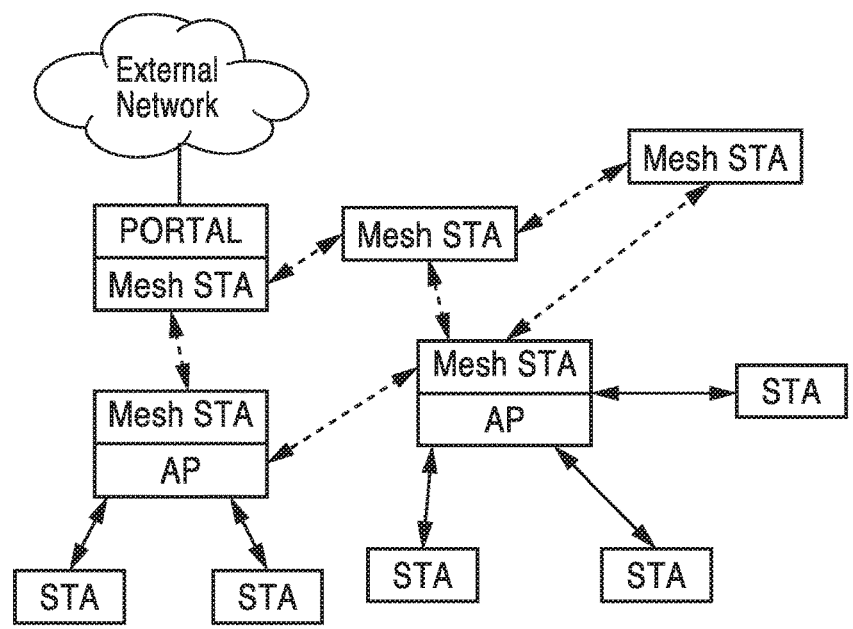
FIG. 2 is a station (STA) diagram for a Distributed Network (DN) showing a combination of DN and non-DN stations.

FIG. 2 illustrates one example of a mesh network where a mix of non-mesh STA connect to Mesh-STA/AP (solid lines) and Mesh STAs connect to other mesh STA (dotted lines) including a mesh portal. Nodes in mesh networks use the same scanning techniques defined in the 802.11 standard for discovering neighbors. The identification of the mesh network is given by the Mesh ID element contained in the Beacon and the Probe Response frames. In one mesh network, all mesh STAs use the same mesh profile. Mesh profiles are considered the same if all parameters in the mesh profiles match. The mesh profile is included in the Beacon and Probe Response frames, so that the mesh profile can be obtained by its neighbor mesh STAs through the scan.

When a mesh STA discovers a neighbor mesh STA through the scanning process, the discovered mesh STA is considered a candidate peer mesh STA. It may become a member of the mesh network, of which the discovered mesh STA is a member, and establish a mesh peering with the neighbor mesh STA. The discovered neighbor mesh STA may be considered a candidate peer mesh STA when the mesh STA uses the same mesh profile as the received Beacon or Probe Response frame indicates for the neighbor mesh STA.

The mesh STA attempts to maintain the discovered neighbor's information in a Mesh Neighbors Table which includes: (a) neighbor MAC address; (b) operating channel number; and (c) the most recently observed link status and quality information. If no neighbors are detected, the mesh STA adopts the Mesh ID for its highest priority profile and remains active. All the previous signaling to discover neighbor mesh STAs are performed in broadcast mode. It should be appreciated that 802.11s was not targeted for networks with directional wireless communications.

Figure 3:
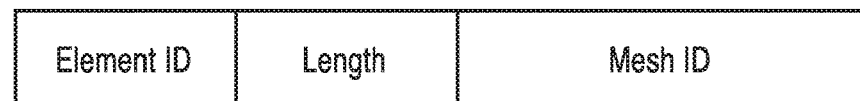
FIG. 3 is a data field diagram depicting a DN identification element for an IEEE 802.11 WLAN.

FIG. 3 depicts a Mesh Identification element (Mesh ID element) which is used to advertise the identification of a Mesh Network. Mesh ID is transmitted in a Probe request, by a new STA willing to join a mesh network, and in beacon and signals, by existing mesh network STAs. A Mesh ID field of length 0 indicates the wildcard Mesh ID, which is used within a Probe Request frame. A wildcard Mesh ID is a specific ID that prevents a non-mesh STA from joining a mesh network. It should be recognized that a mesh station is a STA that has more features than a non-mesh station, for example a mesh network is like having the STA running as a module in additional to some other modules to serve the mesh functionality. If the STA does not have this mesh module it should not be allowed to connect to a mesh network.

FIG. 4 depicts a Mesh configuration element as contained in Beacon frames and Probe Response frames transmitted by mesh STAs, and it is used to advertise mesh services. The main contents of the Mesh Configuration elements are: (a) a path selection protocol identifier; (b) a path selection metric identifier; (c) a congestion control mode identifier; (d) a synchronization method identifier; and (e) an authentication protocol identifier. The contents of the Mesh Configuration Element together with the Mesh ID form a mesh profile.

The 802.11a standard defines many procedures and mesh functionalities including: mesh discovery, mesh peering management, mesh security, mesh beaconing and synchronization, mesh coordination function, mesh power management, mesh channel switching, three address, four address, and extended address frame formats, mesh path selection and forwarding, interworking with external networks, intra-mesh congestion control and emergency service support in mesh BSS.

1.3. Millimeter Wave in WLAN

WLANs in millimeter wave bands generally require the use of directional antennas for transmission, reception or both, to account for the high path loss and to provide sufficient SNR for communication. Using directional antennas in transmission or reception makes the scanning process directional as well. IEEE 802.11ad and the new standard 802.11ay define procedures for scanning and beamforming for directional transmission and reception over the millimeter wave band.

1.4. IEEE 802.11ad Scanning and BF Training

An example of a mmWave WLAN state-of-the-art system is the 802.11ad standard.

1.4.1. Scanning

A new STA operates on passive or active scanning modes to scan for a specific SSID, a list of SSIDs, or all discovered SSIDs. To passively scan, a STA scans for DMG beacon frames containing the SSID. To actively scan: a DMG STA transmits Probe Request frames containing the desired SSID or one or more SSID List elements. The DMG STA might also have to transmit DMG Beacon frames or perform beamforming training prior to the transmission of Probe Request frames.

1.4.2. BF Training

BF training is a bidirectional sequence of BF training frame transmissions that uses a sector sweep and provides the necessary signaling to allow each STA to determine appropriate antenna system settings for both transmission and reception.

The 802.11ad BF training process can be performed in three phases. (1) A sector level sweep phase is performed whereby directional transmission with low gain (quasi-omni) reception is performed for link acquisition. (2) A refinement stage is performed that adds receive gain and final adjustment for combined transmit and receive. (3) Tracking is then performed during data transmission to adjust for channel changes.

1.4.3. 802.11ad SLS BF Training Phase

This SLS BF Training Phase focuses on the sector level sweep (SLS) mandatory phase of the 802.11ad standard. During SLS, a pair of STAs exchange a series of sector sweep (SSW) frames (or beacons in case of transmit sector training at the PCP/AP) over different antenna sectors to find the one providing highest signal quality. The station that transmits first is called the initiator; the station that transmits second is referred to as the responder.

During a transmit sector sweep (TXSS), SSW frames are transmitted on different sectors while the pairing STA (the responder) receives utilizing a quasi-omni directional pattern. The responder determines the antenna array sector from the initiator which provided the best link quality (e.g. SNR).

Figure 5:
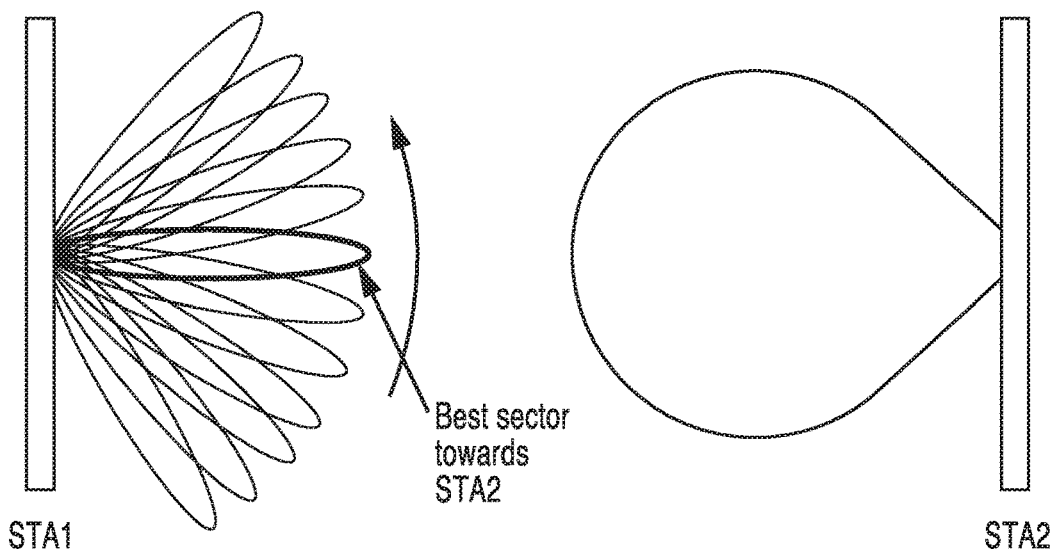
FIG. 5 is a schematic of antenna sector sweeping (SSW) in the IEEE 802.11ad protocol.

FIG. 5 depicts the concept of sector sweep (SSW) in 802.11ad. In this figure, an example is given in which STA 1 is an initiator of the SLS and STA 2 is the responder. STA 1 sweeps through all of the transmit antenna pattern fine sectors while STA 2 receives in a quasi-omni pattern. STA 2 feeds back to STA 2 the best sector it received from STA 1.

Figure 6:
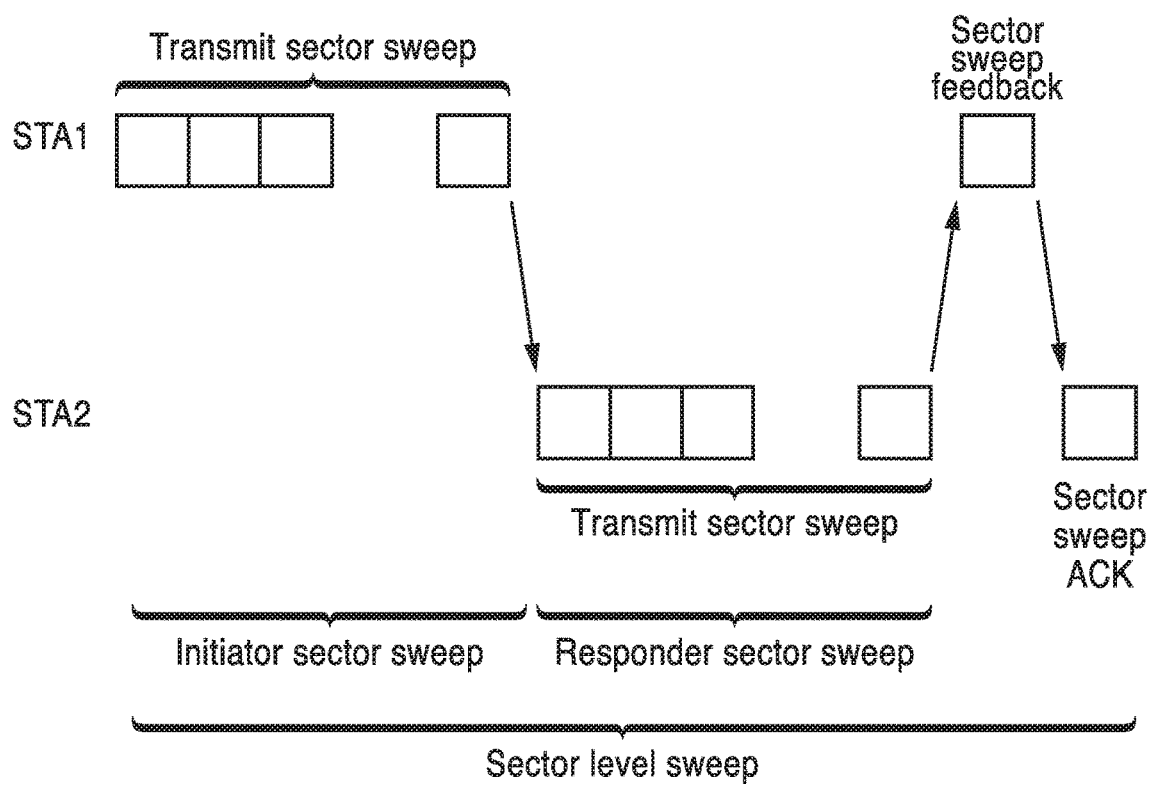
FIG. 6 is a signaling diagram showing signaling of sector-level sweeping (SLS) in the IEEE 802.11ad protocol.

FIG. 6 illustrates the signaling of the sector-level sweep (SLS) protocol as implemented in 802.11ad specifications. Each frame in the transmit sector sweep includes information on sector countdown indication (CDOWN), a Sector ID, and an Antenna ID. The best Sector ID and Antenna ID information are fed back with the Sector Sweep Feedback and Sector Sweep ACK frames.

FIG. 7 depicts the fields for the sector sweep frame (an SSW frame) as utilized in the 802.11ad standard, with the fields outlined below. The Duration field is set to the time until the end of the SSW frame transmission. The RA field contains the MAC address of the STA that is the intended receiver of the sector sweep. The TA field contains the MAC address of the transmitter STA of the sector sweep frame.

FIG. 8 illustrates data elements within the SSW field. The principle information conveyed in the SSW field is as follows. The Direction field is set to 0 to indicate that the frame is transmitted by the beamforming initiator and set to 1 to indicate that the frame is transmitted by the beamforming responder. The CDOWN field is a down-counter indicating the number of remaining DMG Beacon frame transmissions to the end of the TXSS. The sector ID field is set to indicate sector number through which the frame containing this SSW field is transmitted. The DMG Antenna ID field indicates which DMG antenna the transmitter is currently using for this transmission. The RXSS Length field is valid only when transmitted in a CBAP and is reserved otherwise. This RXSS Length field specifies the length of a receive sector sweep as required by the transmitting STA, and is defined in units of a SSW frame. The SSW Feedback field is defined below.

FIG. 9A and FIG. 9B depict SSW feedback fields. The format shown in FIG. 9A is utilized when transmitted as part of an Internal Sublayer Service (ISS), while the format of FIG. 9B is used when not transmitted as part of an ISS. The Total Sectors in the ISS field indicate the total number of sectors that the initiator uses in the ISS. The Number of Rx DMG Antennas subfield indicates the number of receive DMG antennas the initiator uses during a subsequent Receive Sector Sweep (RSS). The Sector Select field contains the value of the Sector ID subfield of the SSW field within the frame that was received with best quality in the immediately preceding sector sweep. The DMG Antenna Select field indicates the value of the DMG Antenna ID subfield of the SSW field within the frame that was received with best quality in the immediately preceding sector sweep. The SNR Report field is set to the value of the SNR from the frame that was received with best quality during the immediately preceding sector sweep, and which is indicated in the sector select field. The poll required field is set to 1 by a non-PCP/non-AP STA to indicate that it requires the PCP/AP to initiate communication with the non-PCP/non-AP. The Poll Required field is set to 0 to indicate that the non-PCP/non-AP has no preference about whether the PCP/AP initiates the communication.

2. Station (STA) Hardware Configuration

Figure 10:
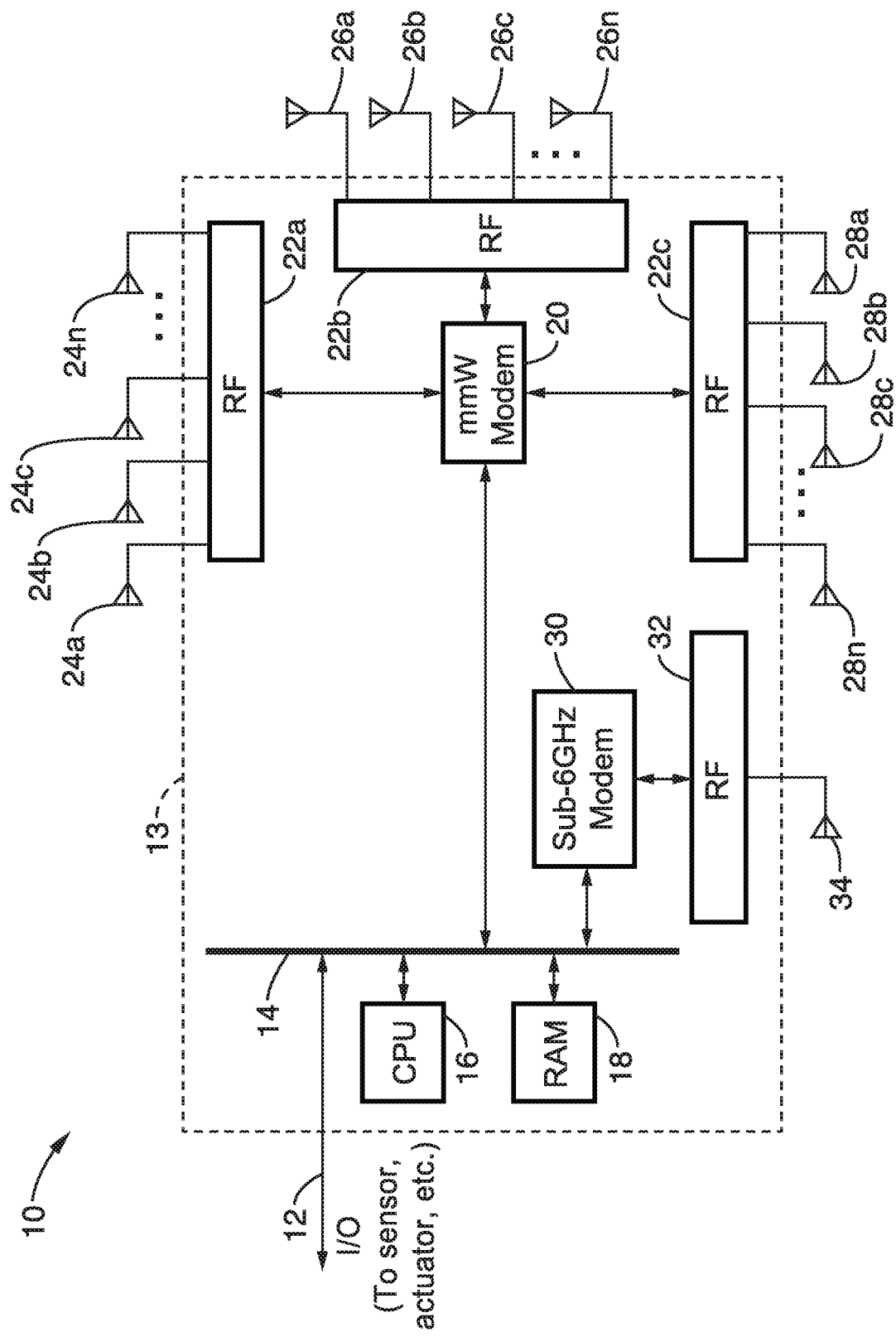
FIG. 10 is a block diagram of wireless mmW communication station hardware as utilized according to an embodiment of the present disclosure.

FIG. 10 illustrates an example embodiment 10 of STA hardware configuration showing I/O path 12 into hardware block 13, having a computer processor (CPU) 16 and memory (RAM) 18 coupled to a bus 14, which is coupled to I/O path 12 giving the STA external I/O, such as to sensors, actuators and so forth. Instructions from memory 18 are executed on processor 16 to execute a program which implements the communication protocols, which are executed to allow the STA to perform the functions of a "new STA", or one of the STAs already in the network. It should also be appreciated that the programming is configured to operate in different modes (source, intermediate, destination), depending on what role it is playing in the current communication context. This host machine is shown configured with a mmW modem 20 coupled to radio-frequency (RF) circuitry 22a, 22b, 22c to a plurality of antennas 24a through 24n, 26a through 26n, 28a through 28n to transmit and receive frames with neighboring STAs. In addition, the host machine is also seen with a sub-6 GHz modem 30 coupled to radio-frequency (RF) circuitry 32 to antenna(s) 34.

Thus, this host machine is shown configured with two modems (multi-band) and their associated RF circuitry for providing communication on two different bands. By way of example and not limitation the intended directional communication band is implemented with a mmW band modem and its associated RF circuitries for transmitting and receiving data in the mmW band. The other band, generally referred to herein as the discovery band, comprises a sub-6 GHz modem and its associated RF circuitry for transmitting and receiving data in the sub-6 GHz band.

Although three RF circuits are shown in this example for the mmW band, embodiments of the present disclosure can be configured with modem 20 coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighbor STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

Figure 11:
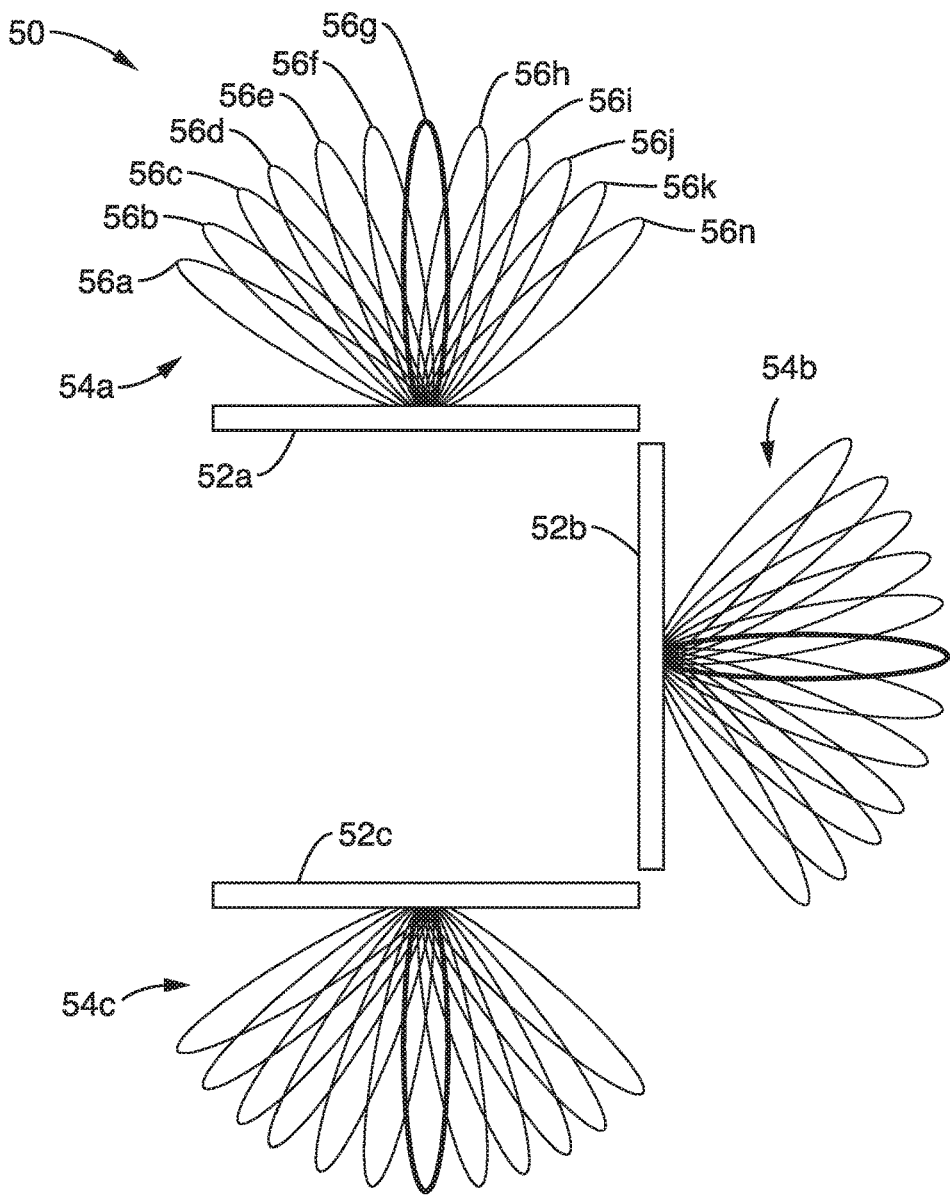
FIG. 11 is a mmW beam pattern diagram for the station hardware of FIG. 10 as utilized according to an embodiment of the present disclosure.

FIG. 11 illustrates an example embodiment 50 of mmWave antenna directions which can be utilized by a STA to generate a plurality (e.g., 36) of mmWave antenna sector patterns. In this example, the STA implements three RF circuits 52a, 52b, 52c and connected antennas, and each RF circuitry and connected antenna generate a beamforming pattern 54a, 54b, 54c. Antenna pattern 54a is shown having twelve beamforming patterns 56a, 56b, 56c, 56d, 56e, 56f, 56g, 56h, 56i, 56j, 56k and 56n ("n" representing that any number of patterns can be supported). The example station using this specific configuration has thirty six (36) antenna sectors, although the present disclosure can support any desired number of antenna sectors. For the sake of clarity and ease of explanation, the following sections generally exemplify STAs with a smaller number of antenna sectors, but this is not to be construed as an implementation limitation. It should be appreciated that any arbitrary beam pattern can be mapped to an antenna sector. Typically, the beam pattern is formed to generate a sharp beam, but it is possible that the beam pattern is generated to transmit or receive signals from multiple angles.

Antenna sector is determined by a selection of mmWave RF circuitry and beamforming commanded by the mmWave array antenna controller. Although it is possible that STA hardware components have different functional partitions from the one described above, such configurations can be deemed to be a variant of the explained configuration. Some of the mmWave RF circuitry and antennas may be disabled when the STA determines it is unnecessary to communicate with neighbor STAs.

In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

Figure 12:
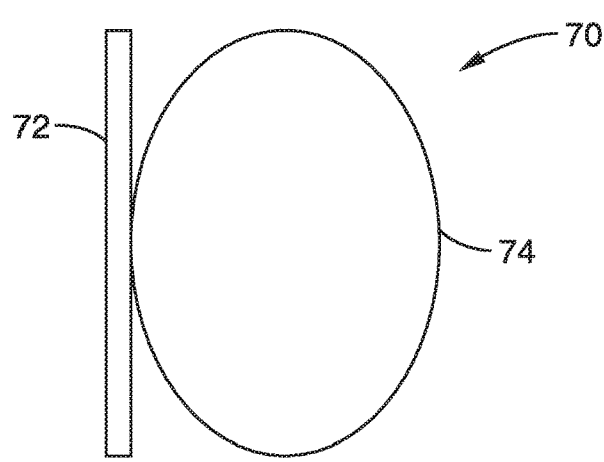
FIG. 12 is a beam pattern diagram for a discovery band communications antenna (i.e., sub-6 GHz), according to an embodiment of the present disclosure.

FIG. 12 illustrates an example embodiment 70 of antenna pattern for the sub-6 GHz modem assumed to use a quasi-omni antenna 74 attached to its RF circuitry 72, although other circuitry and/or antennas may be utilized without limitation.

3. Unassigned Slot Announcements in Present Disclosure

The present disclosure teaches a number of elements which provide for the distribution of information on unassigned slots for TDD SP channel access. It will be appreciated that TDD SP is a new access scheme that was added to the WLAN 802.11 standard. For STAs that are not using TDD SP, a solution is to keep trying to access the channel until STAs are successful in obtaining the channel when it is not occupied. If the TDD SP is used in the STA trying to access the channel, it will schedule its slots without knowing about the nearby TDD SP networks which might be affected by interference and also impacting other networks with interference.

The disclosure provides a protocol for operating stations to broadcast a report of the unassigned slots by the STA when it is using TDD SP channel access in the direction of transmission or in all directions. By way of example, the disclosure generally describes the use of beacon frames for broadcasting this channel allocation information, however, anywhere a beacon frame can be utilized in this regard, it may also be switched with any other type of frame that is used for discovery or initial beamforming purposes. The STA deploying TDD SP channel access informs other STAs in the surrounding area about allocation in the direction of transmission or the spectrum allocation across all directions. In this disclosure, another STA is considered in the surrounding area if it is this stations coverage area and can transmit and receive data with it. Other STAs receiving this information can determine the time when the channel is unoccupied by the TDD SP transmission, the directions where interference is a threat and directions where the sensed signal is not a threat.

4. Time Allocation Information

Figure 13:
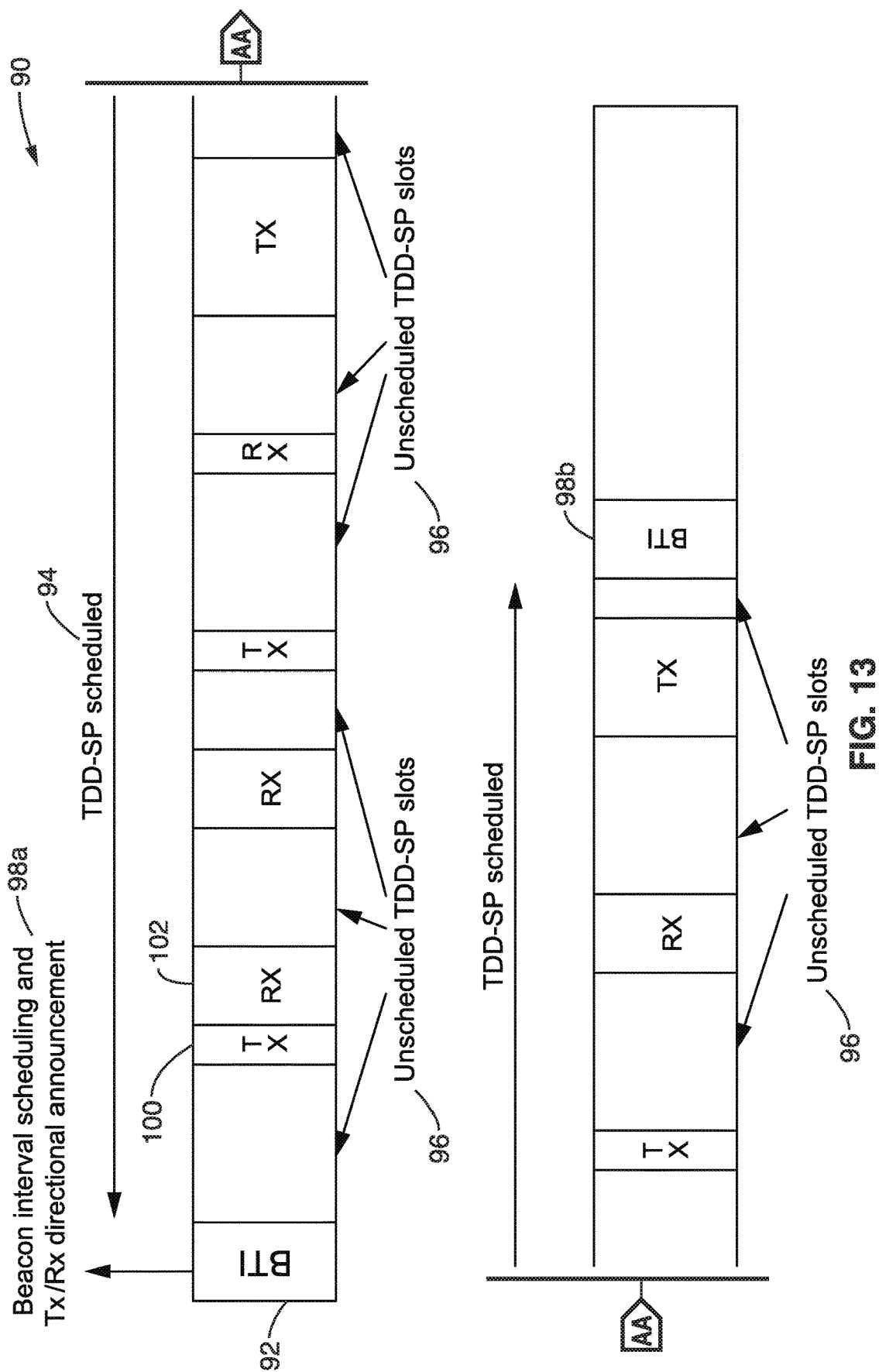
FIG. 13 is a data field diagram depicting example WLAN frames containing time allocation information, including unallocated slots, for TDD SP channel access according to an embodiment of the present disclosure.

FIG. 13 illustrates an example embodiment 90 of a WLAN super frame using TDD SP channel access. In this example, superframe 90 comprises a number of fields 92, and contains a service period 94 that is divided into a number of slots which can be allocated for Tx or Rx. The beacon interval scheduling and Tx/Rx directional announcements are contained within beacons sent during BTI 98a, 98b. The beacon transmitted during the BTI has information about the unused scheduled resources 96 (unscheduled resources) which represent time resources that are not assigned to an access scheme or defined by the beacon as empty and unscheduled. The node receiving the beacon can figure out the unscheduled TDD slots 96 that are not scheduled to any STA, or that are scheduled to other STAs that will not interfere with its own intended transmission. By way of example a number of assigned periods for transmit (Tx) 100 and receive (Rx) 102 are seen in the figure.

5. Unassigned Directional Spectrum Announcement

In TDD SP channel access the station (STA) slots (time slots within the service period) are assigned to each STA as Tx and Rx slots. As presently deployed, each TDD SP scheduled assignment is sent individually to the scheduling STA only, and thus only the STA itself is aware of this assignment. However, in contrast to the above, the present disclosure presents STAs in the surrounding area operating TDD SP, or other access modes, with information on slot assignments in their direction of interest to plan their channel accesses accordingly, and thus increase channel utilization.

STAs can broadcast information about the unassigned slots in each direction, or in all directions, to other STAs receiving this announcement. If the STA broadcasts the unassigned slots across all directions for the TDD SP, the STA receiving the slot schedule would assume the channel is occupied even if the transmission was not in that direction. If the STA broadcasts the unassigned slots in each direction, the STA receiving the slot schedule would receive improved information about directional occupation of the channel.

6. WLAN Coexistence

If a station (node) is made aware of access to the channel by other stations, the efficiency and the coexistence between nodes in the network can be enhanced. Since, under TDD SP channel access, nodes can access the channel without sensing; then making other nodes aware of TDD channel usages can increase the possibility of coexistence with a TDD SP channel.

Information about the channel, such as TDD slot structure, TDD scheduling for nodes in the TDD network, and times (slots) where the channel is scheduled or not scheduled, is broadcast in at least one embodiment to all nodes in the surrounding area. Other nodes in the surrounding area scan for this information, and if it exists they can use this information to aid their channel accesses.

(A) Modifications for STAs in the network using TDD-SP perform as follows. (1) Each STA using TDD SP is sending beacons at least in the direction where another STA is communicating using TDD SP. (2) The beacon should contain the TDD slot structure and TDD schedule element for each allocation in the TDD SP. (3) The TDD Schedule element should contain the unused/unassigned slots.

(B) Modifications for STAs in the network receiving the announcement perform as follows. (1) STAs outside the TDD-SP network (e.g., using TDD-SP channel access or other channel access method) can receive the broadcasted beacon if they are not engaged in transmission or reception and if the beacon is beamformed towards its receiving direction. (2) STAs receiving the beacon can decode the beacon. (3) STAs can obtain information about the TDD SP structure and the scheduled SPs. (4) STAs can obtain information about scheduled slots in their specific directions of interest. (5) STAs can identify free time slots to interference free communication in the direction of its transmission or reception. (6) STAs can quickly beamform with the detected STA from where a beacon was received just to determine the direction of potential interference without associating or authenticating with the discovered STA. (7) STAs can access the channel even if the CCA threshold measured using a quasi omni antenna is not met but the detected interference is detected from a different direction other than the one intended for communication.

7. Informational Elements

7.1. TDD SP Allocation and Directionality Broadcasting

The TDD Schedule element contains information about the access assignment of a DMG STA to TDD slots within a TDD SP. It is used to inform a STA about when to transmit and expect reception within an allocated TDD-SP period.

Figure 14:
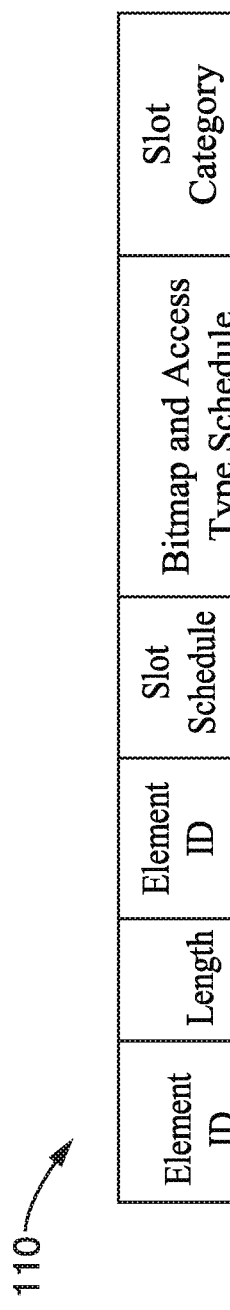
FIG. 14 is a data field diagram depicting a TDD slot structure element according to an embodiment of the present disclosure.

FIG. 14 illustrates an example embodiment 110 for a TDD slot schedule element. The element ID, Element ID extension and length indicate the type of element and length of the element. The slot schedule control field is described in detail in FIG. 15. The bit map and access type schedule and slot category schedule indicate the mapping for transmit and reception as well as the type of slots for this specific allocation.

More particularly, the Bitmap and Access Type Schedule field defines the type of a TDD slot and the access permission of a DMG STA to the TDD slots covered by this bitmap. In this specific embodiment, each pair of consecutive bits indicates the type and access permission of the TDD slot. A binary value of 10 represents an AP or PCP transmission to a non-AP or a non-PCP, and a binary value 01 represents an AP or PCP reception from a non-AP or a non-PCP. The other binary values of 00 and 11 can be used to indicate a slot that is not assigned to any transmission or reception, and a slot that is unassigned to this direction but assigned in a different direction. In at least one other implementation only one slot type is utilized to represent slots that are not assigned to this direction alone or not assigned in all directions. The size of the Bitmap and Access Type Schedule field, as exemplified beneath the figure as $$\left\lfloor \frac{Q \times M}{4} \right\rfloor,$$

is a function of the value of the Number of TDD Slots per TDD Interval subfield in the TDD Slot Structure element M, and the value of the Number of TDD Intervals in the Bitmap subfield Q. It should be appreciated that in this example embodiment, each slot uses two bits for indicating the type or schedule, so that the size in bits equal to 2×Q×M and to convert it to octets, it is divided by 8 thereby resulting in $$\left\lfloor \frac{Q \times M}{4} \right\rfloor.$$

If padding is required to make the size of this field an integer number, a TDD slot of type "unassigned" is used. The TDD slots defined by the Bitmap and Access Type Schedule field are repeated for the duration indicated by the TDD Slot Schedule Duration subfield value.

Figure 15:
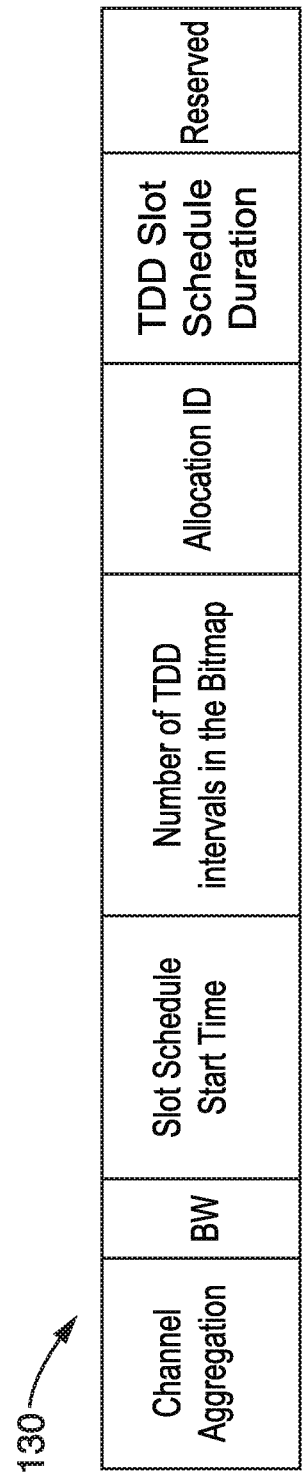
FIG. 15 is a data field diagram of a control field format of the TDD slot structure element seen in FIG. 14, according to an embodiment of the present disclosure.

FIG. 15 illustrates an example embodiment 130 of the format of a control field for the TDD slot structure element seen in FIG. 14. The channel aggregation and BW fields define BW that the allocation is utilizing. It will be noted that allocations might assign a number of channels to use, which is an indicator of how much bandwidth is used. The slot schedule start time indicates when the schedule element information takes effect. The Number of TDD Intervals in the Bitmap indicates the number of TDD intervals in the bitmap after the TDD schedule start time. The allocation ID refers to a specific allocation identified by that ID. If the Allocation ID is set to zero and the allocation Type is TDD SP, this indicates unassigned slots. This allocation is not intended for a specific source or destination and provides information to STAs in the surrounding area about the unassigned resources in the medium. It should be appreciated that the above field descriptions, and the other fields described throughout the application, can be implemented using a wide range of value to functional/state associations without departing from the teachings of the present disclosure.

8. Allocation and Direction Broadcasting Examples

8.1. Broadcasting Unassigned Slots for TDD SP Access

The STA broadcasts the unassigned slots in all directions. A new allocation ID is reserved to indicate the unassigned slots. This ID can be assigned to zero for example while the allocation type is TDD SP. This information is added in a new TDD Schedule information element with the reserved Allocation ID. The slots being marked with type "unassigned" is an indication that the AP or PCP is not scheduling them for transmission or reception to any other STA in its BSS. The STA can transmit the TDD scheduling information through a beacon frame with the Discovery bit set to one or a regular beacon if the STA is an AP or PCP.

Figure 16:
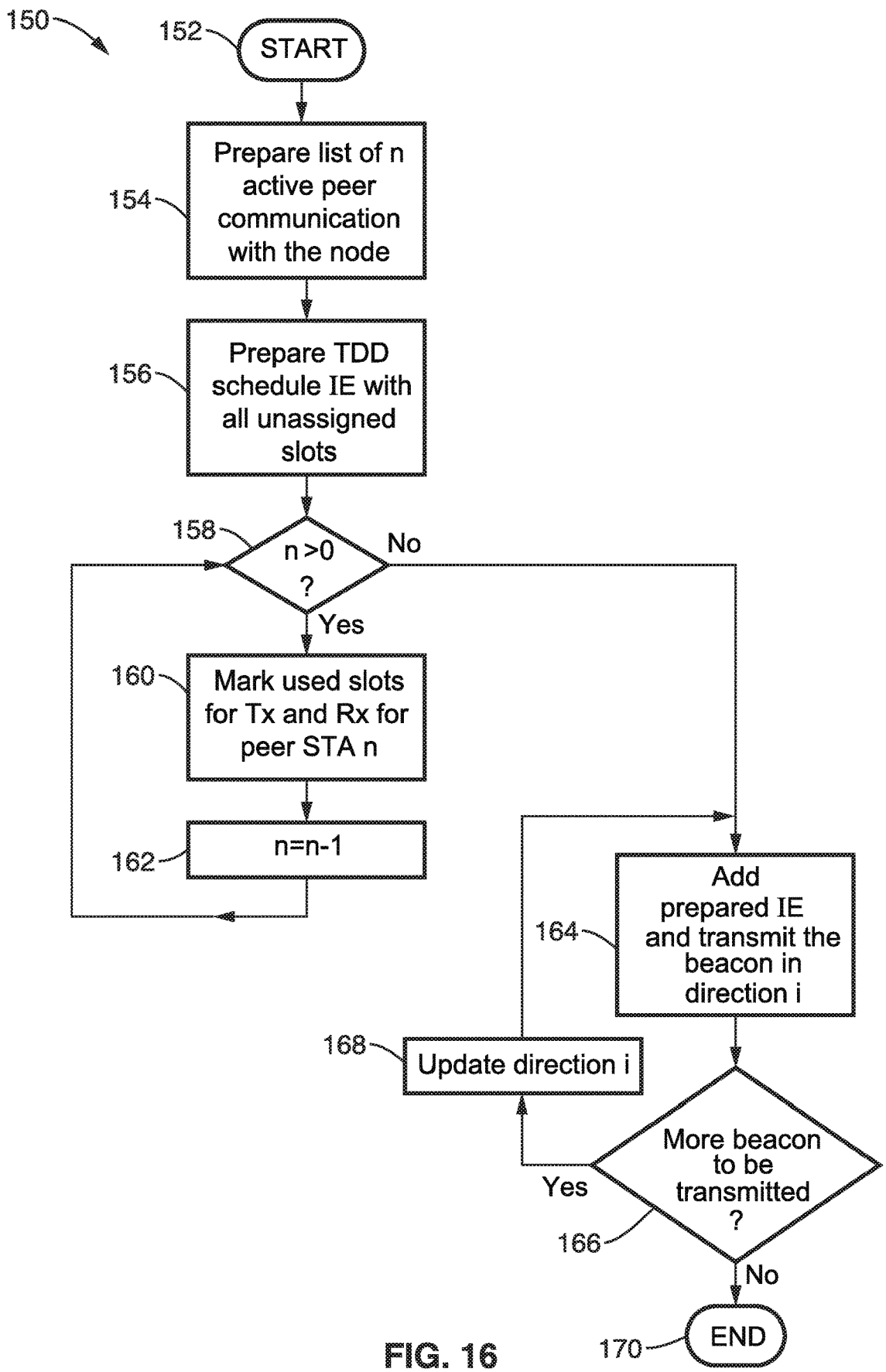
FIG. 16 is a flow diagram of a station preparing the TDD schedule element with all unassigned slots for all scheduled TDD allocations according to an embodiment of the present disclosure.

FIG. 16 illustrates an example embodiment 150 for a STA preparing the TDD schedule element with all unassigned slots and all scheduled TDD allocations. Processing starts 152 and a list is prepared 154 of the n active peers which are communicating with the station (node). Then a TDD schedule is prepared 156 indicating all unassigned slots. A check is made 158 if any of the slots used for any of the n peers still needs to be added to the list. If there is still more peers, then at block 160 slots used for Tx or Rx are marked for peer STA n, and the peer counter value is updated 162 to another peer station. Once no more peers exist from which to collect the information as determined by a 'No' decision at check 158, then execution reaches block 164 and an information element is prepared for an associated beacon transmitted in direction i. A check is made 166 to determine if more beacons are to be transmitted. If more beacons are to be transmitted, then direction i is updated 168 with execution returning to block 164, otherwise execution reaches the end 170 of this processing.

Thus, it is seen in the figure that the STA goes through the n active TDD scheduled allocations and prepares the TDD schedule slot with a unique allocation ID that is assigned to unassigned slots information. The slots that are assigned can be marked as Tx and Rx to indicate the direction of transmission and represent all used slots in the BSS. The unassigned slots represent the unassigned slots across all directions for transmission or reception.

Figure 17A:
FIG. 17A and FIG. 17B are data field diagrams of a beacon transmitted in different directions according to an embodiment of the present disclosure.
Figure 17B:
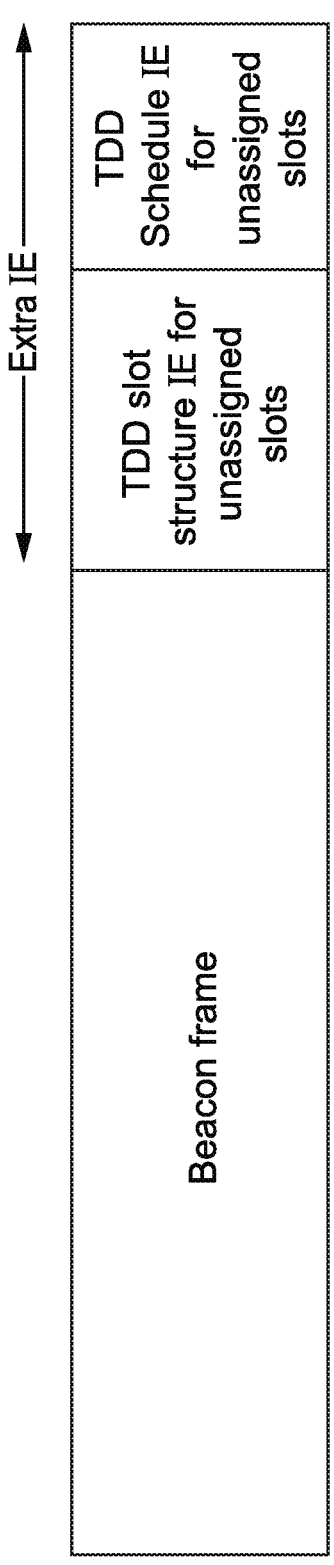

FIG. 17A and FIG. 17B illustrate an example embodiment 190, 210 of a beacon transmitted in direction i and another beacon transmitted in direction i+1 where each carry the same added elements for the unassigned slots. In the figures it is seen that the beacon frame is enhanced with extra Information Elements (IE) containing TDD slot structure for unassigned slots, and a TDD schedule for unassigned slots.

8.2. Transmitting Unassigned Slots for Each Direction

The STA is configured according to the present disclosure for assigning a unique allocation ID to a TDD slot schedule and structure elements that contain the unassigned slots in each direction.

Figure 18:
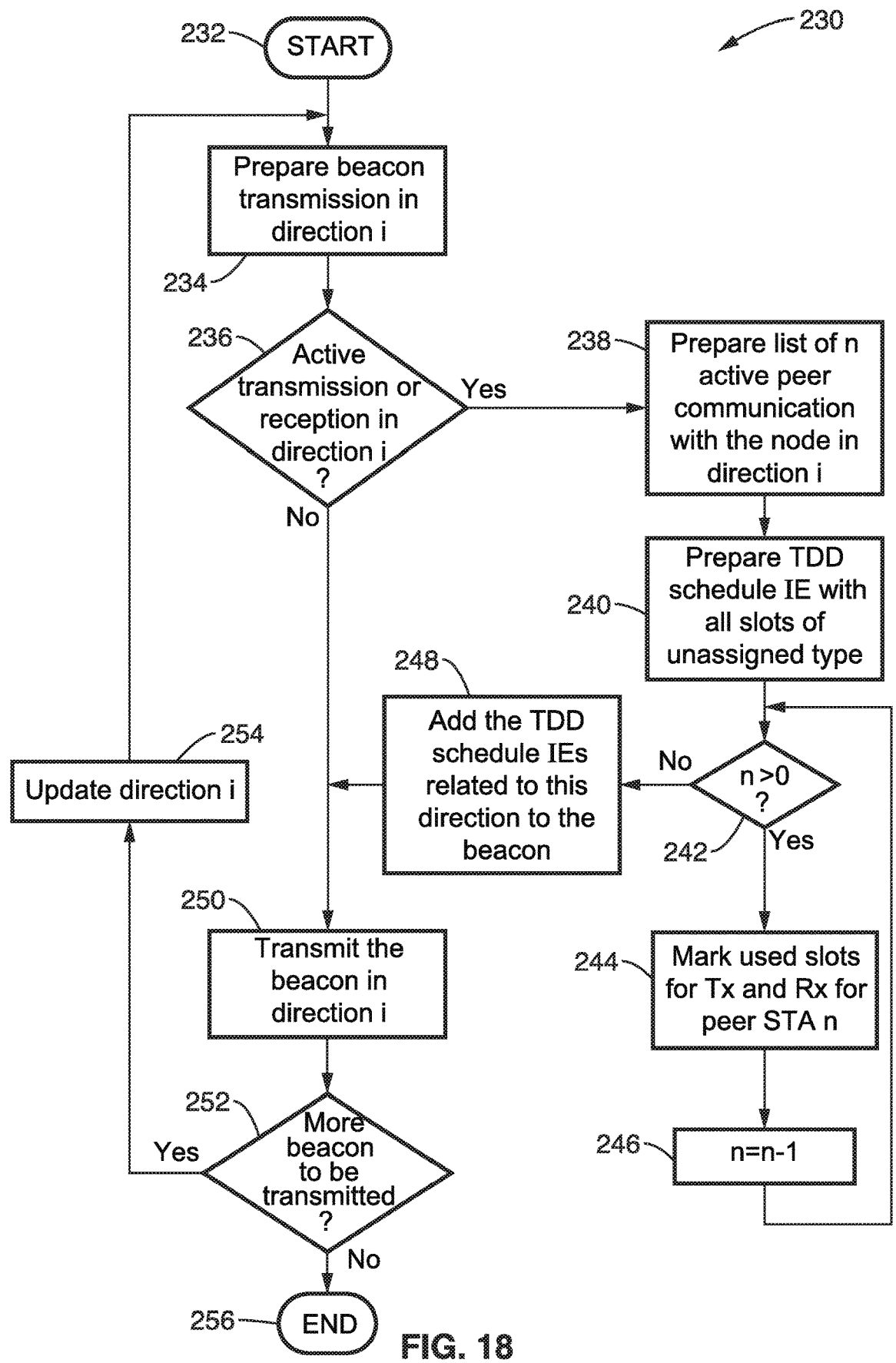
FIG. 18 is a flow diagram of a station transmitting beacons containing unassigned slot information in each direction, according to an embodiment of the present disclosure.

FIG. 18 illustrates an example embodiment 230 of preparing a procedure in which the STA transmits the beacons with information of unassigned slots in each direction. In order to do so, the procedure for the STA sequences through checking all active transmissions/receptions in the beacon transmission direction and marks the unassigned slots in that direction in a TDD slot schedule element. This element as well as the slot structure element is broadcast in the beacon with a unique allocation ID.

In the figure, processing starts at block 232 and preparation 234 for beacon transmission is performed for direction i, followed by a check for active transmission or reception at block 236. If active Tx/Rx is being performed in direction i, as determined at block 236; then block 238 is reached with a list of n actively communicating peers with the node in direction i, followed by preparing 240 a TDD schedule Information Element (IE) with all slots of type "unassigned". A check is made 242 to determine if any peers remain for this loop. If there are still peers, then at block 244 used slots are marked for Tx and Rx for peer STA n, after which the peer counter is updated 246, with a return made to the check at block 242. After all peers are processed, then block 248 is reached which adds the TDD schedule Information Elements for this direction to the beacon, and reaches block 250 during which the beacon is transmitted in direction i. A check is made 252 to determine if there are more beacons to be transmitted. If there are more beacons to transmit, then direction is updated at block 254 and execution returns to block 234, otherwise this processing is complete 256.

Thus, it is seen in the figure that in each direction the STA transmits TDD schedule slots with the unique allocation ID that represents the unassigned slots. The allocation indicates the slots of type "unassigned" in that direction. It should be appreciated that in at least one implementation, the direction can have a different TDD slot schedule element to indicate the unassigned slots in that direction. In at least one embodiment, both the STA and AP/PCP broadcast this information in the BSS they are a part of. The STA can transmit the information through a beacon frame with Discovery bit set to one. Directionality information is maintained in this procedure where each direction contains different TDD slot information about the unassigned slots.

Figure 19A:
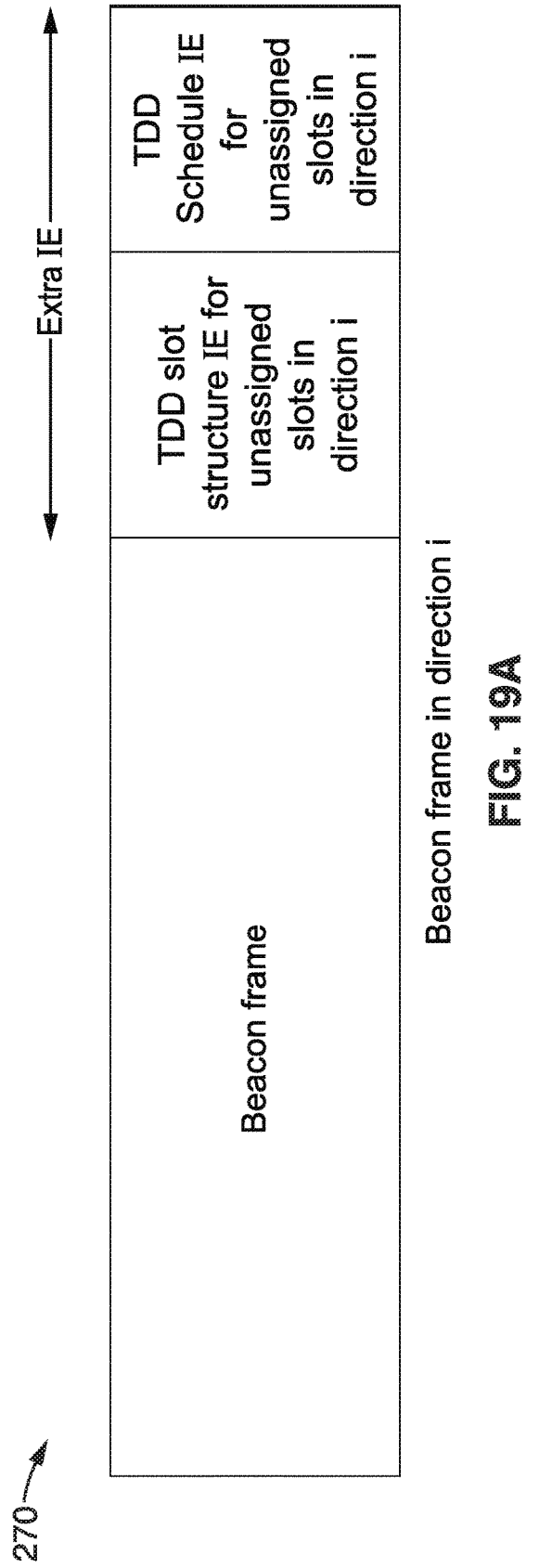
FIG. 19A and FIG. 19B are data field diagrams of example beacon frames transmitted with TDD slot structure in different directions, according to an embodiment of the present disclosure.
Figure 19B:
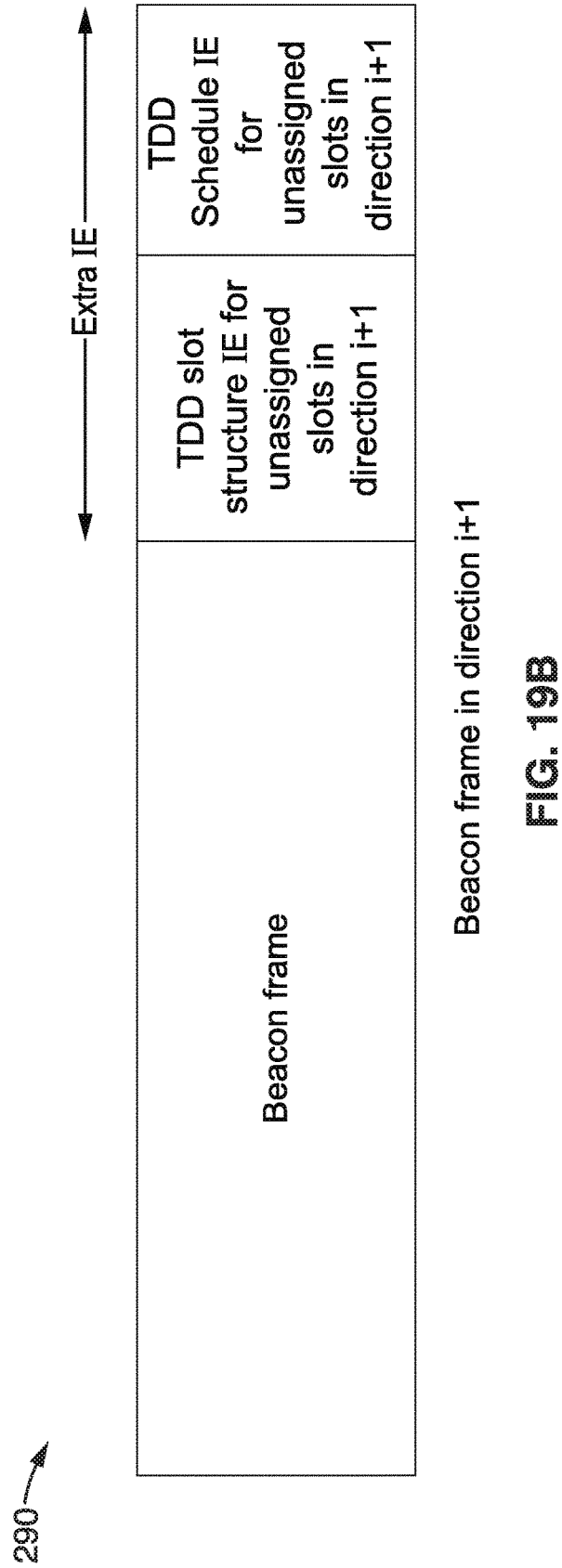

FIG. 19A and FIG. 19B illustrates an embodiment 270, 290 showing two examples of beacon frames transmitted with TDD slot structure and TDD slot schedule elements including the allocation ID and the unassigned slot schedule toward direction i and i+1. The figures depict the beacon frames along with the extra IE of TDD slot structures and schedules for unassigned slots in direction i and direction i+1.

8.3. Directional and Spectral Assignment Broadcasting

The STA according to the present disclosure assigns a unique allocation ID to a TDD slot schedule and structure elements that contain the unassigned slots in each direction. In each direction the STA transmits a TDD slot schedule with the unique allocation ID that represents the unassigned slots. The allocation indicates the slots of type "unassigned" in that direction as well as the slots that are unassigned in this transmission direction, but that are assigned in other directions. The two levels of unassignment broadcasting, unassigned in this direction only, versus unassigned in all directions, enable improved spectrum utilization while still avoiding interference. In this embodiment, slot type can be one of four types: (1) Tx slot, (2) Rx slot, (3) Unassigned in this direction, and (4) Unassigned in all directions. It is noted that any slot of type (4) Unassigned in all directions, is also of type (3) unassigned in this direction. However type 4 carries more information about other directions. Each direction has a different TDD slot schedule element to indicate the unassigned slots in that direction. In at least one embodiment, both STA and AP/PCP are configured for broadcasting this information in the BSS they are part of. The STA can transmit this allocation information through a beacon frame with Discovery bit set to 1, or alternatively in other frames. Directionality information is maintained in this procedure where each direction contains different TDD slot information about the unassigned slots.

Figure 20A:
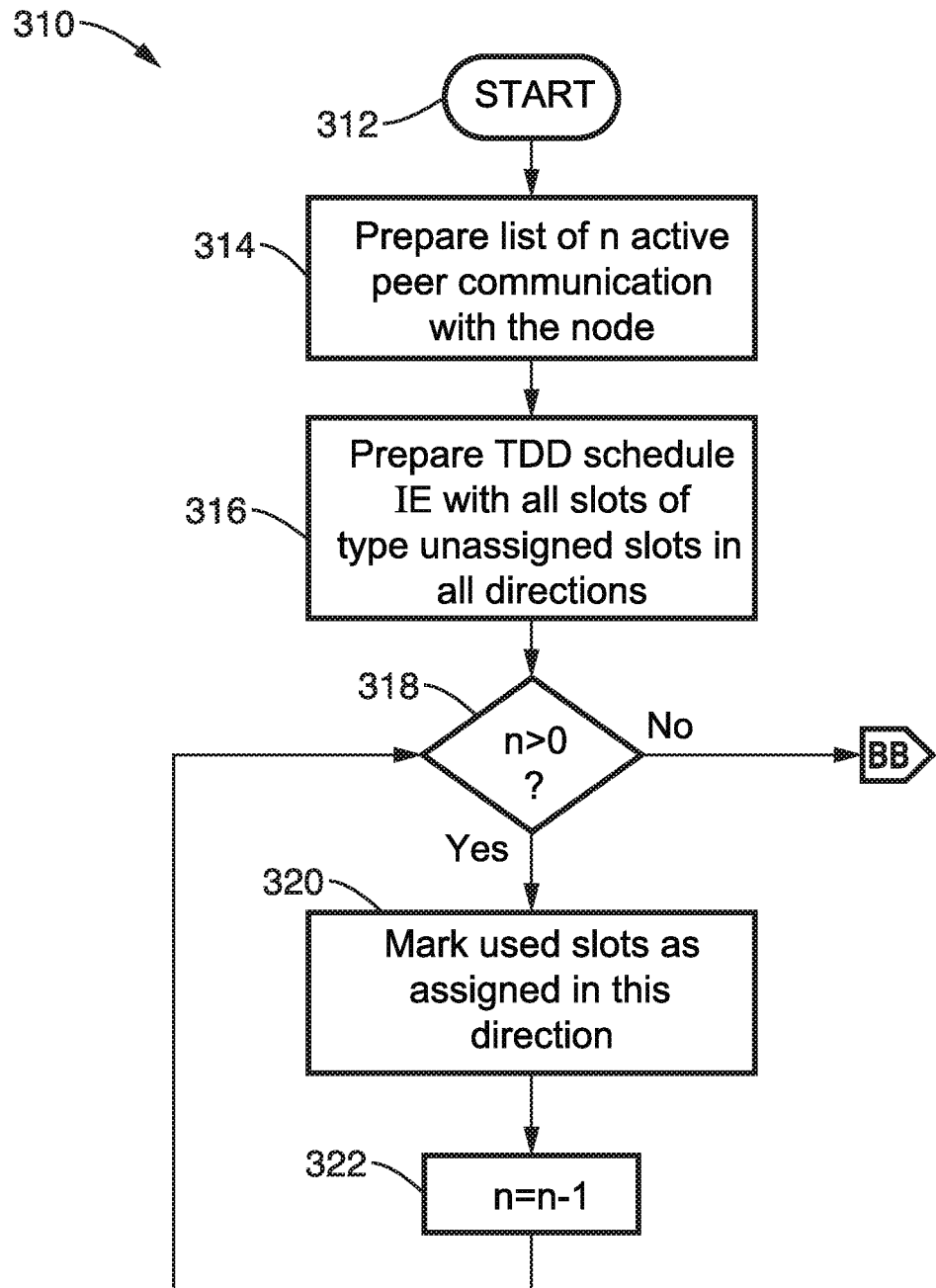
FIG. 20A and FIG. 20B is a flow diagram of sending beacon frames with directional and spectral assignment broadcasting according to an embodiment of the present disclosure.
Figure 20B:
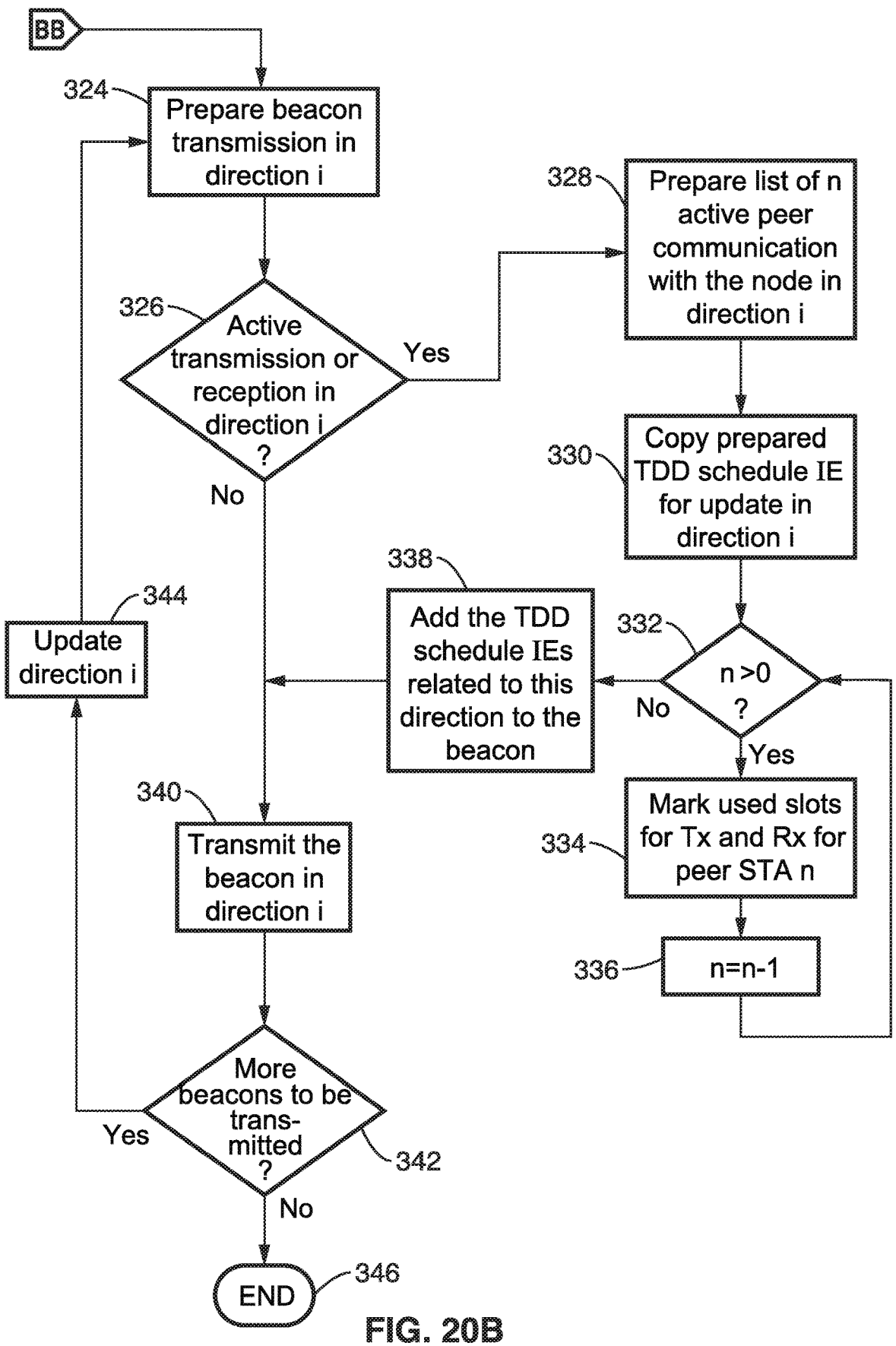

FIG. 20A and FIG. 20B illustrates an example embodiment 310 of this sending of beacon frames with directional and spectral assignment broadcasting. Processing starts 312 in FIG. 20A and a list is prepared 314 of n active peers communicating with the node, followed by preparing 316 a new TDD slot schedule with slot type mapping to represent the unassigned slots in this direction and the unassigned slots in all directions for each beacon transmission. A check 318 is made if there are active peers remaining to be processed. If true, then used slots are marked 320 as assigned in this direction. After which the peer counter is updated 322 and processing returns to block 318.

Otherwise, if no more peers are found at block 318, then block 324 in FIG. 20B is reached which prepares beacon transmission in direction i. A check is made 326 if either transmission or reception is active in direction i. If there is activity, then at block 328 a list is prepared of n peers actively communicating with the node in direction i. Then at block 330 the prepared TDD schedule IE is updated for direction i, followed by a check 332 if any peers remain to be checked. If peers remain, then at block 334 the used slots are marked with Tx and Rx for peer STA n, and the peer number is updated 336 followed by a return to block 332. Once all peers are checked, then block 338 is reached which adds the TDD schedule Information Elements (IEs) for this direction to the beacon, and at block 340 transmits the beacon in direction i. A check is made at block 342 if more beacons still need to be transmitted. If there are more beacons to transmit, then block 344 updates the beacon direction i, and the top of the loop at block 324 is reached. Otherwise, execution ends 346 once all beacons have been processed.

9. Receiving Allocation and Directional Information

According to the present disclosure, any STA receiving the TDD SP Schedule and Structure elements, the extended schedule element, and/or the directional information element through a beacon frame, for example, can extract information about the spectrum allocation in the direction it is receiving from. The STA receiving that beacon frame can extract information about the channel usage in this direction. The STA can take one of these actions: (1) process unassigned slots in this direction and all directions, (2) process unassigned slots across all directions, or (3) process unassigned slots in this direction only.

Figure 21:
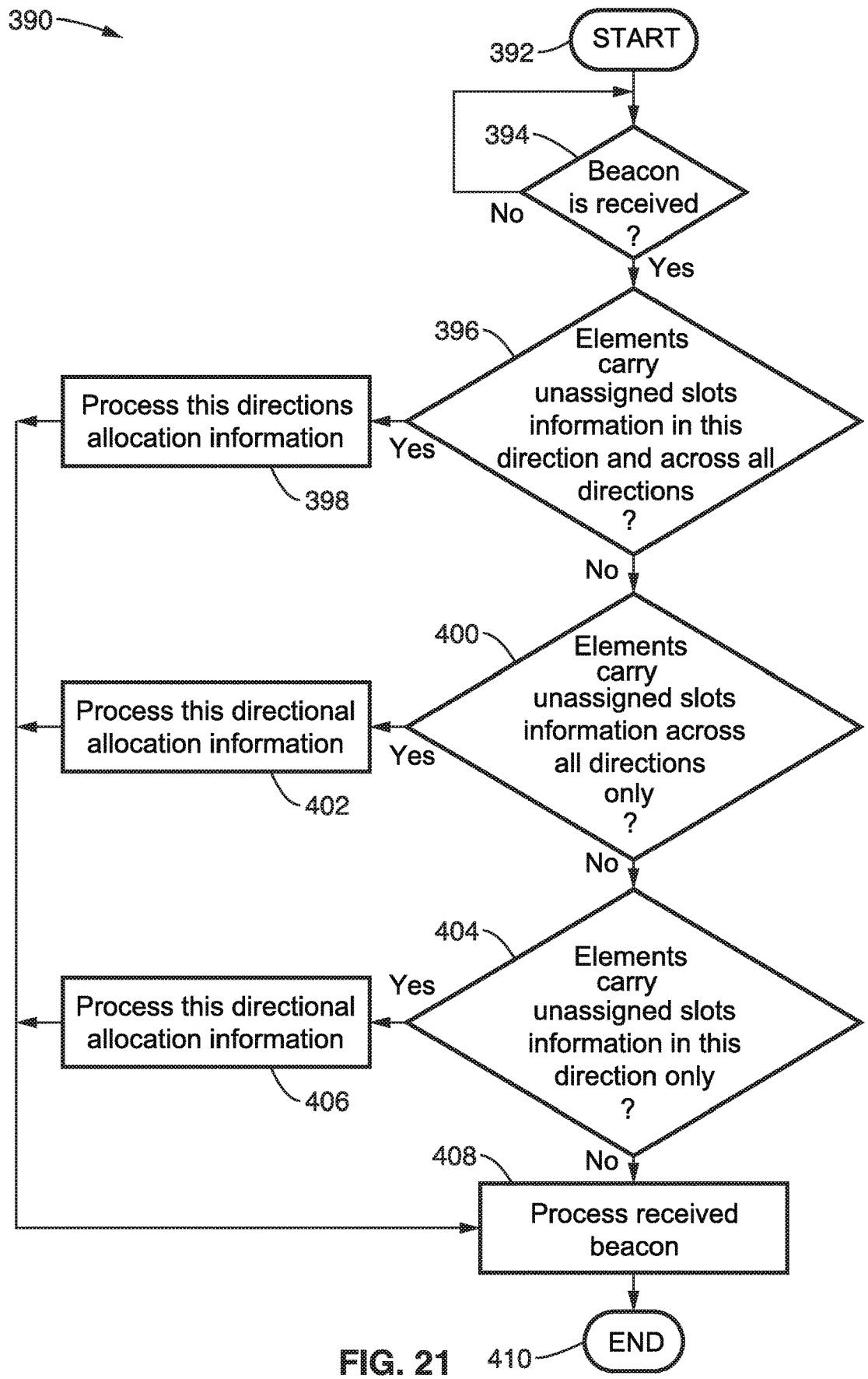
FIG. 21 is a flow diagram of a station receiving beacons according to an embodiment of the present disclosure.

FIG. 21 illustrates an example embodiment 390 of a STA receiving beacons. The process starts 392 and a check is made 394 to determine if a beacon was received. If no beacon was received, then execution returns to the start. Upon a beacon being received, a check is made at block 396 to determine if the allocation element carries unassigned slot information for this direction and across all directions. If that is true, then block 398 is reached which processes all directions of allocation information. Otherwise, if block 396 is not true, then block 400 is reached which checks to determine if the allocation element carries unassigned slot information across all directions (and not for this particular direction). If 400 is true, then block 402 is reached which processes this directional allocation information. If block 400 is not true, then block 404 is reached which checks if the allocation element carries unassigned slot information for this direction only. if block 404 is found to be true, then block 406 is executed which processes this directional allocation information. If the check at block 404 is not true, or upon completing any of blocks 398, 402 and 406, then execution reaches block 408 which processes received beacons and ends 410, to be executed later in checking for another beacon.

Thus, the above figure shows that the beacons can be from another STA within the BSS that the STA is part of, or from a BSS of different STAs. The STA can process the beacon information, even if it was from a different BSS than the one the STA is part of. Once an STA receives a beacon, if allocation information does not exist in the beacon, the STA processes the beacon in the typical manner. If TDD SP allocation information exists (TDD SP schedule and structure elements), the STA checks for unassigned slot information in the TDD schedule element. If the unassigned slots represent the unassigned slots in all directions, the STA can combine this information with the channel sensing information to determine if the assigned slots are in its receiving direction or not. If the unassigned slots represent unassigned slots in the direction of the received beacon, then the STA can determine exactly the empty slots in the direction the beacon is received from. If the STA receives information about the unassigned slots in the direction of reception as well as the unassigned slots in all directions from a specific STA, it can provide improved decisions with regard to spectrum reuse and interference avoidance.

This processing by the receiver provides a number of advantages, including the following: (a) avoiding transmission or reception at a time when the other nodes are active in transmission or reception; (b) performing beamforming with the node to allocate this direction of interference; (c) estimating expected interference and determining periods in which interference is expected to be less compared to other periods of time; and (d) estimating level of occupancy of a specific STA in case direct communication is needed with that STA.

It should be appreciated that receiving the unassigned slots in the direction of the received beacon provides more certainty that interference is affecting the receiving STA if any transmission occurs outside the unassigned slots and in the direction of the received beacon. However, if the information received represents the unassigned slots across all directions, then the STA assumes that there is a possibility that this interference is in it's direction of transmission or reception. Having both forms of information available from the received beacon and from the STA provides two levels of protection from the confirmed direction of interference and potential interference from nearby transmissions. Beamforming can be utilized in conjunction with the allocation information to find the potential interference direction.

10. Beamforming to Determine Interference Direction

A STA receiving a beacon containing directional and allocation information is informed about the existence of a potential interference on a specific time allocation. Since the sensing is usually performed using a quasi-omni directional antenna, it is not known which direction can be affected by this interferer. A STA detecting a potential interference can trigger beamforming to determine the direction of the potential interferer. It will be noted that the purpose of beamforming in this case is not to setup a link or authenticate/associate with the discovered node, but only to determine sources of potential interference. The beamforming is triggered based on the type of channel access the discovered STA is using, TDD beamforming, or regular beamforming. One embodiment of the present disclosure performs Rx beamforming by sending TRN fields (Training fields) with the beacon or the SSW frame. This can aid the STA in finding the direction of interference without the need to communicate with the other STA. After beamforming with the interferer, the STA can determine the direction the interference is coming from and take that in account when accessing the spectrum in that direction.

Figure 22A:
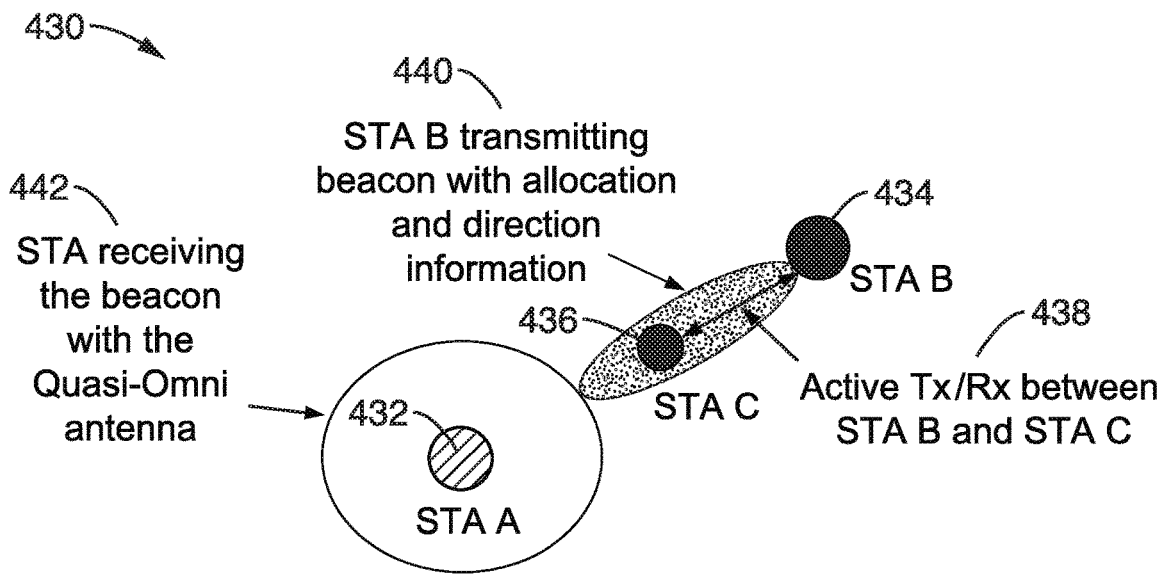
FIG. 22A through FIG. 22C is a communication process diagram between stations performing beamforming to discover potential interference directions according to an embodiment of the present disclosure.
Figure 22B:
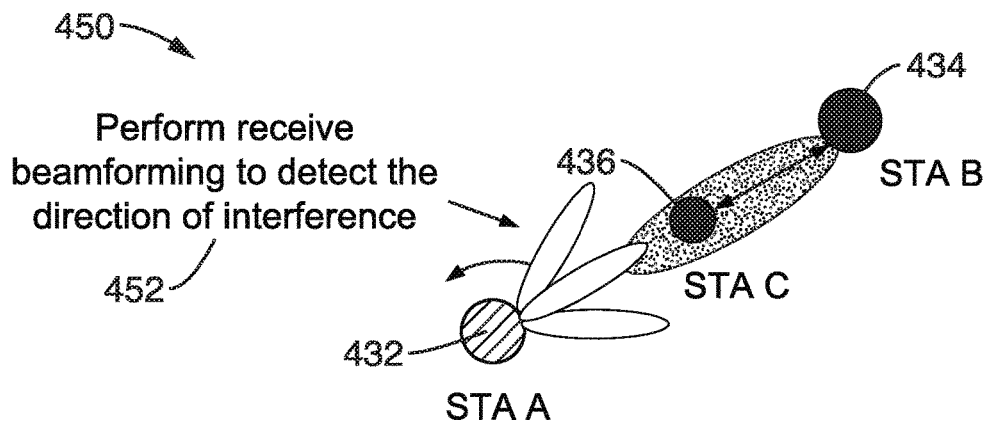
Figure 22C:
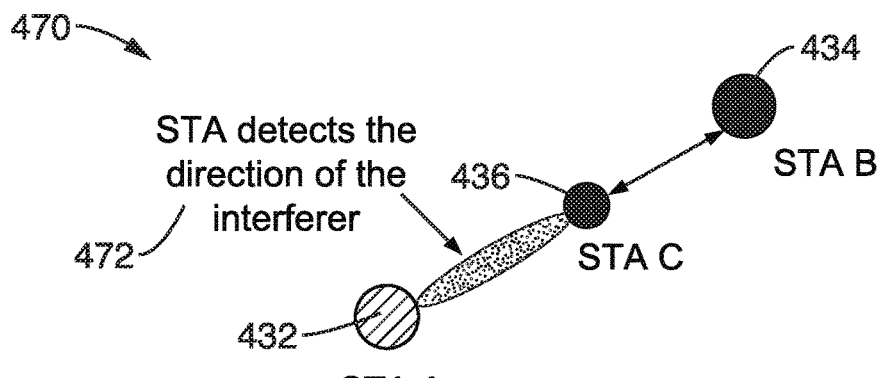

FIG. 22A through FIG. 22C illustrate an example embodiment showing steps 430, 450 and 470 of a procedure in which a STA receives a beacon with allocation and directional information. The figure depicts stations 432 STA A, 434 STA B, and 436 STA C. In FIG. 22A, there is an active 438 Tx or Rx session between 434 STA B and 436 STA C. STA B 434 is transmitting 440 beacons containing allocation and direction information. STA A 432 receives 442 this beacon with its quasi-omni antenna, and considers that it may be a source of interference. In response to which FIG. 22B depicts STA A 432 using the information from the beacon and performing receive beamforming 452 with the discovered interferer. Then in FIG. 22C STA A 432 has detected 472 the direction of the interferer.

11. Accessing the Channel Above CCA Threshold

A STA utilizing the CCA procedure as defined in IEEE WLAN 802.11 and sensing a channel using a quasi-omni antenna can obtain a false indication of channel usage in a direction it is interested in utilizing. If the channel is free of transmissions and is not occupied, then the CCA is considered a success. If the channel is occupied by other transmissions, then the CCA is considered to have failed. If the STA CCA succeeds, the channel is not occupied, and the STA should be free to access the channel. However, a failure of the CCA may be a false alarm, because the STA is intending to communicate in a different direction in relation to the sensed interference.

Figure 23A:
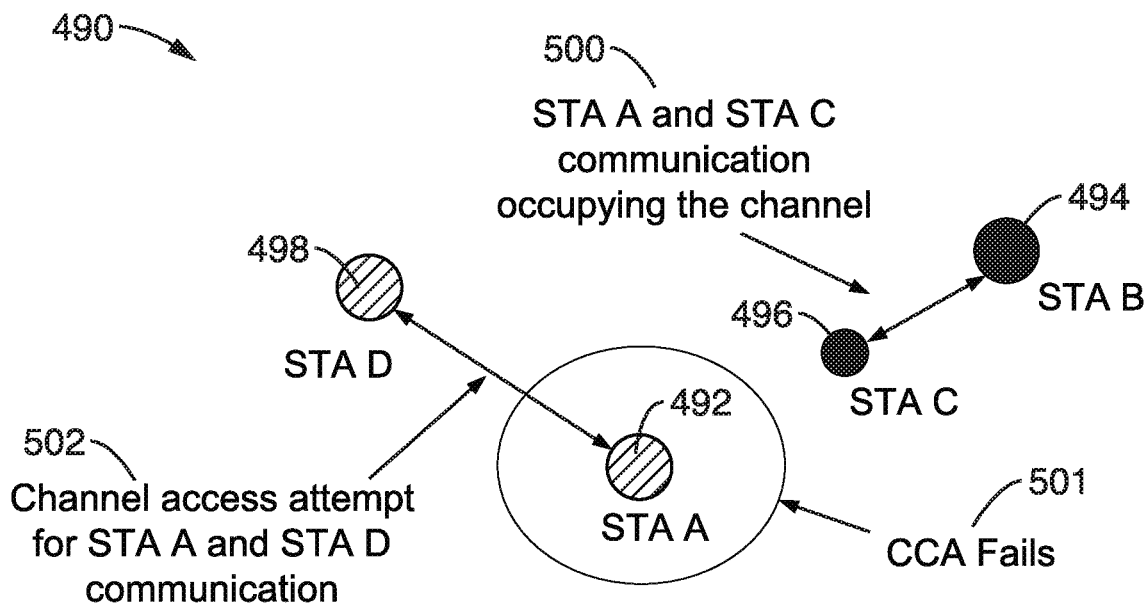
FIG. 23A through FIG. 23D is a communication process diagram between stations configured for accessing the channel above the CCA threshold according to an embodiment of the present disclosure.
Figure 23B:
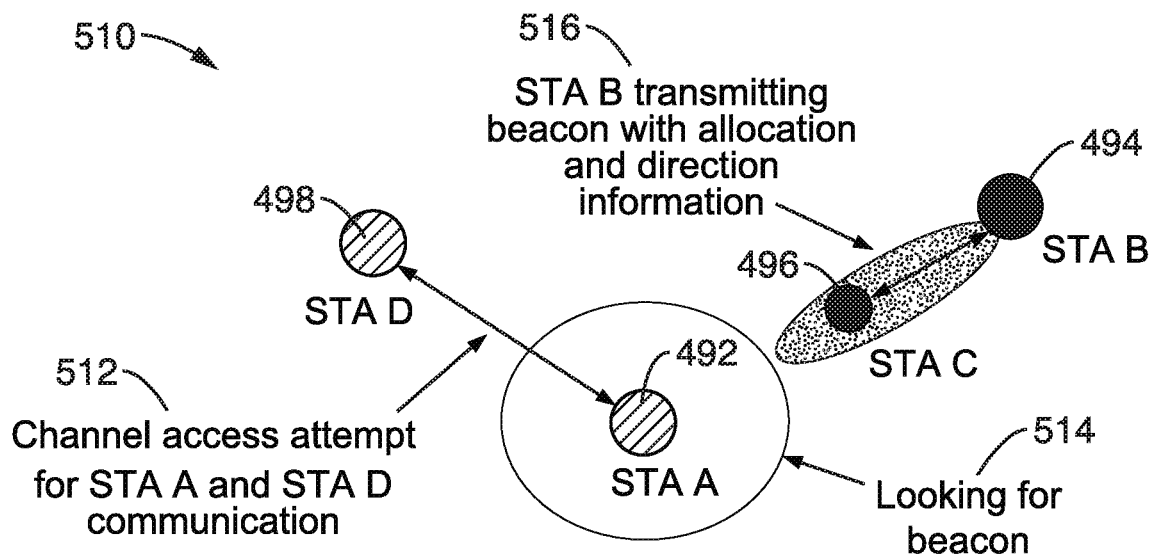

FIG. 23A through FIG. 23D illustrates an example embodiment with steps 490, 510, 530 and 550, showing interaction between 492 STA A, 494 STA B, 496 STA C, and 498 STA D. In FIG. 23A it is seen that STA B 494 and STA C 496 are actively communicating 500 which occupies a directional channel. STA A 492 performs a CCA 501 as part of a channel access attempt 502. In FIG. 23B it is seen that the channel access fails 512 because of a failed CCA, so that STA A 492 starts listening 514 for beacons. STA B 494 is seen transmitting 516 a beacon containing allocation and direction information.

Figure 23C:
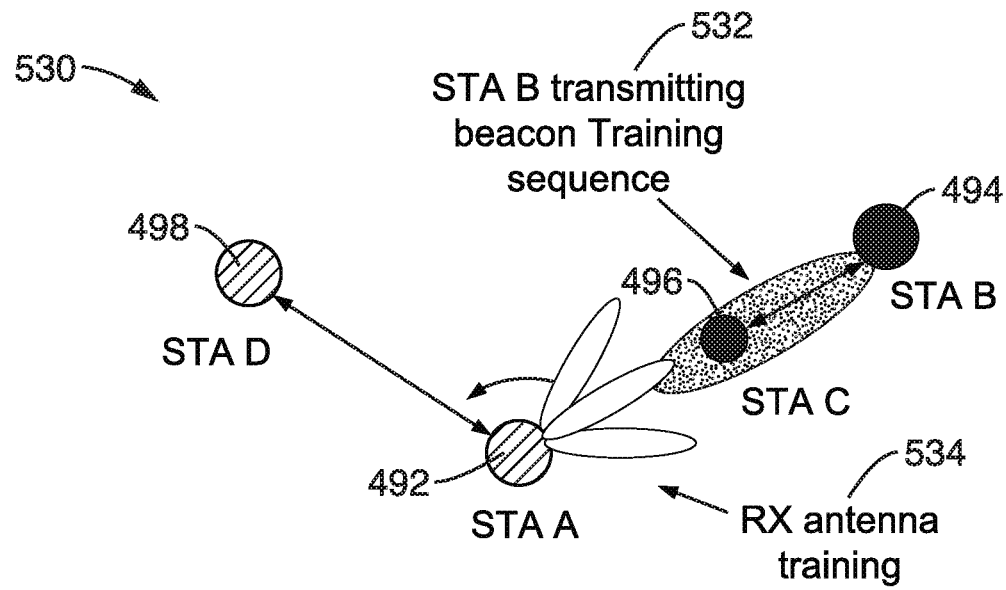

Since the beacon was found by STA A 492, then FIG. 23C depicts this allocation and directional information being used to determine if the interference is in the direction of intended communication. The beacon carries information about the occupied slots in either its direction, or across all directions, of the STA from which the beacon is transmitted. If the beacon received contains the unassigned slots in the direction of the beacon, the other slots represent time allocations where interference might be a threat. If the beacon received contains the unassigned slots across all directions of the STA the beacon is transmitted from, the interferer might be in a direction that is not affecting the sensing node. If the beacon is marked as a potential interferer, the STA according to at least one embodiment of the present disclosure performs beamforming, which is actually Rx antenna training 534 in cooperation with the interferer STA B 494 transmitting a beacon training sequence 532, to allow STA A 492 to determine the receiving direction affected by the interferer. The STA transmitting the beacon, for example, can transmit TRN fields (Training fields) to assist the other STA in Rx beam training.

Figure 23D:
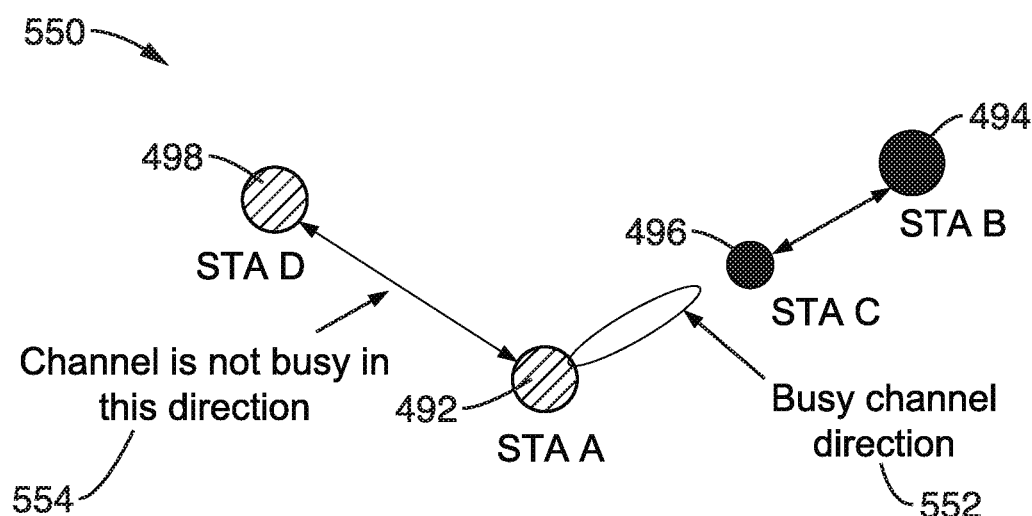

The beamforming result, as seen in FIG. 23D is that STA A 492 marks some directions 552 at the sensing node as busy directions, while other directions 554 are now properly understood as not being busy. Thus, the node can now determine the busy direction and access the not-busy directions even if the CCA fails.

12. Summary of Disclosure Elements

The following summary discloses certain important elements of the instant disclosure, however the summary is not to be construed as describing the only important elements of the disclosure.

STAs operate TDD SP channel access and broadcast the unassigned TDD SP slots to other STAs in the surrounding area in their BSS or outside their BSS network. The STA broadcasts a map of the unassigned slots in its direction of transmission, or across all directions of transmission.

A STA broadcasts the TDD SP unassigned slots with the network discovery signal or any announcement frames that can be received by any STA in the surrounding area. It should be appreciated that the phrase "discovery signal" is a broader description of frames which include beacon frames, as the beacon frame is but one type of frame used for discovery, other frames may also be utilized for discovery according to the present disclosure without limitation.

A STA adds the unassigned slots in the direction of transmission in the TDD schedule element and allocates a unique allocation ID to it for identifying unassigned slot map allocation.

A STA adds the unassigned slots across all directions in the TDD schedule element and allocates a unique allocation ID to it for identifying the unassigned slot map allocation.

A STA adds the unassigned slots across all directions and the unassigned slots in the direction of transmission in the TDD schedule element and allocates a unique allocation ID to it for identifying the unassigned slot map allocation.

The TDD SP unassigned SP can be of two types, unassigned in the direction of transmission, and unassigned across all directions.

In at least one embodiment, each STA at least transmits beacons in the direction of transmission with the unassigned slots information. Other STAs receiving the beacons can obtain information about the allocation and directionality of transmission in the network.

STAs can perform Rx beamforming with the received beacon if it is indicating interference in its direction. This is exemplified as being achieved through the sending of additional training fields attached to the beacon, or other discovery frame, or the use of other beamforming techniques.

STAs can use the Rx beamforming information to identify channel usage directions. If the sensed channel usage turned out to be from a direction other that the intended direction of access, the STA can access the channel even if the CCA fails.

13. General Scope of Embodiments

The enhancements described in the presented technology can be readily implemented within the protocols of various wireless communication stations. It should also be appreciated that wireless communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in every one of the diagrams for the sake of simplicity of illustration, as one of ordinary skill in the art recognizes the use of computer devices for carrying out steps involved with controlling a wireless communication station. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a network, the apparatus comprising: (a) a wireless communication circuit configured for wirelessly communicating with at least one other wireless communication circuit using directional communications; (b) a processor coupled to said wireless communication circuit within a station configured for operating on a wireless network; (c) a non-transitory memory storing instructions executable by the processor; and (d) wherein said instructions, when executed by the processor, perform steps comprising: (d)(i) broadcasting a report of unassigned slots within a service period (SP) per each direction of said directional communications, when said station is using time division duplexing (TDD) channel access, thus informing other stations about slot allocation in the direction of transmission, or across all directions of transmission; and (d)(ii) receiving by said station, said report of unassigned slots, within a service period (SP) per each direction of said directional communications from other stations, and determining times and directions for which channels are unoccupied by said time division duplexing (TDD) channel access, to determine whether sensed communication signals pose an interference threat.

2. An apparatus for wireless communication in a network, the apparatus comprising: (a) a wireless communication circuit configured for wirelessly communicating with at least one other wireless communication circuit using directional communications; (b) a processor coupled to said wireless communication circuit within a station configured for operating on a wireless network; (c) a non-transitory memory storing instructions executable by the processor; and (d) wherein said instructions, when executed by the processor, perform steps comprising: (d) (i) broadcasting a report of unassigned slots within a service period (SP), either inside or outside of a basic service set (BSS) of said station, per each direction of said directional communications, when said station is using time division duplexing (TDD) channel access, thus informing other stations about slot allocation in the direction of transmission, or across all directions of transmission; (d)(ii) wherein said broadcasting is configured for incorporating information about said unassigned slots of a time division duplexing service period (TDD SP) within discovery signaling, beacon frames, or announcement frames being transmitted; (d)(iii) receiving by said station, said report of unassigned slots, within a service period (SP) per each direction of said directional communications from other stations, and determining times and directions for which channels are unoccupied by said time division duplexing (TDD) channel access, to determine whether sensed communication signals pose an interference threat; and (d)(iv) receiving said report of unassigned slots and performing receiver beamforming with another station to determine if possible interference is either true or false, and accessing a channel in response to determining that possible interference is false, even if a clear channel assessment (CCA) has failed.

3. A method of performing wireless communication in a network, the method comprising: (a) performing wireless communication circuit configured for wirelessly; (b) broadcasting a report of unassigned slots from a wireless communications circuit configured for communicating with at least one other wireless communication circuit using directional communications; (c) wherein said report of unassigned slots is broadcast within a service period (SP) per each direction of said directional communications, when said station is using time division duplexing (TDD) channel access, thus informing other stations about slot allocation in the direction of transmission, or across all directions of transmission; and (d) receiving by said station, said report of unassigned slots, within a service period (SP) per each direction of said directional communications from other stations, and determining times and directions for which channels are unoccupied by said time division duplexing (TDD) channel access, to determine whether sensed communication signals pose an interference threat.

4. The apparatus or method of any preceding embodiment, wherein said instructions when executed by the processor perform said broadcasting the report of unassigned slots to other stations in a basic service set (BSS) of said station, or outside of that BSS.

5. The apparatus or method of any preceding embodiment, wherein said instructions when executed by the processor performs said broadcasting by incorporating information about said unassigned slots of a time division duplexing service period (TDD SP) within discovery signaling, beacon frames, or announcement frames being transmitted.

6. The apparatus or method of any preceding embodiment, wherein said instructions when executed by the processor is further configured for assigning a unique allocation ID to each slot in a time division duplexing (TDD) slot schedule and incorporating structure elements that indicate unassigned slots in each direction.

7. The apparatus or method of any preceding embodiment, wherein said instructions when executed by the processor is further configured for adding information about unassigned slots across all directions in the time division duplexing (TDD) schedule element and allocating a unique allocation ID to it for identifying the unassigned slot map allocation.

8. The apparatus or method of any preceding embodiment, wherein said instructions when executed by the processor is further configured for adding information about unassigned slots across all directions for each time division duplexing service period (TDD SP) schedule element and allocating a unique allocation ID to it for identifying the unassigned slot map allocation.

9. The apparatus or method of any preceding embodiment, wherein said instructions when executed by the processor is further configured for performing said broadcasting for communicating: (a) slots that are unassigned in the direction of transmission, and (b) slots that are unassigned across all directions of transmission.

10. The apparatus or method of any preceding embodiment, wherein said instructions when executed by the processor is configured for performing said broadcasting within a beacon transmitted in a direction of transmission, wherein said beacon contains information about unassigned slots, whereby other stations receiving the beacon can obtain information about slot allocation and directionality of transmission in the network.

11. The apparatus or method of any preceding embodiment, wherein said instructions when executed by the processor is configured for receiving said report of unassigned slots and performing receiver beamforming with another station to determine if possible interference is either true or false.

12. The apparatus or method of any preceding embodiment, wherein said instructions when executed by the processor is further configured for accessing a channel in response to determining that possible interference is false, even if a clear channel assessment (CCA) has failed.

13. The apparatus or method of any preceding embodiment, wherein said instructions when executed by the processor is configured for performing said beamforming by utilizing beamforming training fields attached to the beacon.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:
   (a) a wireless communication circuit configured for wirelessly communicating with at least one other wireless communication circuit using directional communications;
   (b) a processor coupled to said wireless communication circuit within a station configured for operating on a wireless network;
   (c) a non-transitory memory storing instructions executable by the processor; and
   (d) wherein said instructions, when executed by the processor, perform steps comprising:
      announcing unscheduled or unused time resources to other stations in the surrounding area by the station using time division duplexing (TDD) service period (SP) allocation by broadcasting a frame to announce TDD SP details in at least a direction where the channel is occupied, wherein receiving stations can add the TDD slot structure for each allocation and a map of unused time slots which are not-scheduled by the station or this basic service set (BSS); and
      (ii) receiving announcements from other stations of unscheduled or unused time resources and decoding the information to determine TDD SP structure and information about the unoccupied time slots or SPs and a time when the channel should be free.

2. The apparatus of claim 1, wherein said instructions when executed by the processor perform said broadcasting the report of unassigned slots to other stations in a basic service set (BSS) of said station, or outside of that BSS.

3. The apparatus of claim 1, wherein said instructions when executed by the processor performing said receiving announcements from other stations of unscheduled or unused time resources, further comprises beamforming with a detected station where a beacon is received for directional channels and determining a direction of potential interference without associating or authenticating with the detected station.

4. The apparatus of claim 1, wherein said instructions when executed by the processor receiving announcements from other stations of unscheduled or unused time resources further comprising accessing a directional channel even if a clear channel assessment (CCA) threshold measured using a Quasi Omni antenna is not met, because interference is detected from a different direction than the one intended for communication.

5. The apparatus of claim 1, wherein said instructions when executed by the processor performing said announcing unscheduled or unused time resources to other stations, further comprises broadcasting unassigned time slots in multiple beamformed directions, wherein the unassigned time slots represent unassigned time slots across the channel without respect to beamform direction.

6. The apparatus of claim 1, wherein said instructions when executed by the processor performing said announcing unscheduled or unused time resources to other stations, further comprises broadcasting unassigned time slots only in directions where an allocation is beamformed, wherein each beamformed direction contains different information about the unassigned slots in this direction.

7. The apparatus of claim 1, wherein said instructions when executed by the processor performing said announcing unscheduled or unused time resources to other stations, further comprising broadcasting unassigned time slots in multiple beamformed directions, wherein unassigned time slots are broadcast within the same frame which contains both unassigned time slots across the channel without respect to beamform direction, and unassigned time slots in a specific beamformed direction.

8. The apparatus of claim 1, wherein said instructions when executed by the processor performing said receiving announcements from other stations further comprises avoiding transmission or reception at times when other stations are active in transmission or reception, performing beamforming with active stations to allocate a direction of interference, estimating expected interference and determining periods with reduced chance of interference, and estimating levels of occupancy of a specific station in case direct communication is needed with that station.

9. The apparatus of claim 1, wherein said instructions when executed by the processor performs said receiving of announcements from other stations of unscheduled or unused time resources, further comprising determining the receiver beamformed direction affected by the interference by performing an extra signal transmitted by the interferer to help the station identify the receiver direction affected by the signal.

10. The apparatus of claim 1, wherein said instructions when executed by the processor perform said receiving announcements from other stations of unscheduled or unused time resources further comprises the station accessing the channel even though a clear channel assessment (CCA) indicates that the channel is occupied if the station has determined a direction for the interference and used a different direction in transmission or reception that does not interfere with the current transmission direction of the channel.

11. An apparatus for wireless communication in a network, the apparatus comprising:

(a) a wireless communication circuit configured for wirelessly communicating with at least one other wireless communication circuit using directional communications;
(b) a processor coupled to said wireless communication circuit within a station configured for operating on a wireless network;
(c) a non-transitory memory storing instructions executable by the processor; and
(d) wherein said instructions, when executed by the processor, perform steps comprising:
communicating time division duplexing (TDD) slot structure comprising a TDD schedule and time when a service period (SP) is scheduled, or not scheduled, to all nodes in the surrounding area;
(ii) receiving information on said time division duplexing (TDD) slot structure allowing the station to efficiently access the channel and avoid times when it is known that other stations are accessing the channel; and
(iii) broadcasting a frame to announce TDD SP details in at least the direction where the channel is occupied, wherein receiving stations can add the TDD slot structure for each allocation and a map to the unused time slots which are not-scheduled by the station or this basic service set (BSS).

12. The apparatus of claim 11, wherein said instructions when executed by the processor performing said communication of time division duplexing (TDD) slot structure, further comprising beamforming with a detected station where a beacon is received for directional channels determining a direction of potential interference without associating or authenticating with the detected station.

13. The apparatus of claim 11, wherein said instructions when executed by the processor in performing said receiving information on said time division duplexing (TDD) slot structure further comprising accessing a directional channel even if the clear channel assessment (CCA) threshold measured using a Quasi Omni antenna is not met, because interference is detected from a different direction than the one intended for communication.

14. The apparatus of claim 11, wherein said instructions when executed by the processor for performing said announcing unscheduled or unused time resources to other stations, further comprises broadcasting unassigned time slots in multiple beamformed directions, wherein the unassigned time slots represent unassigned time slots across the channel without respect to beamform direction.

15. The apparatus of claim 11, wherein said instructions when executed by the processor in performing communication of said time division duplexing (TDD) slot structure which further comprises broadcasting unassigned time slots only in directions where an allocation is beamformed, wherein each beamformed direction contains different information about the unassigned slots in this direction.

16. The apparatus of claim 11, wherein said instructions when executed by the processor performs said communicating time division duplexing (TDD) slot structure and further comprises broadcasting unassigned time slots in multiple beamformed directions, wherein unassigned time slots are broadcast within the same frame which contains both unassigned time slots across the channel without respect to beamform direction, and unassigned time slots in a specific beamformed direction.

17. A method of performing wireless communication in a network, the method comprising:

(a) performing wireless communication between a station and other stations on a wireless network;

(b) announcing unscheduled or unused time resources by a station using time division duplexing (TDD) service period (SP) allocation and which is configured for wireless communication with other stations in the surrounding area on the network by broadcasting a frame to announce TDD SP details in at least a direction where the channel is occupied, wherein receiving stations can add the TDD slot structure for each allocation and a map of unused time slots which are not-scheduled by the station or this basic service set (BSS);

(c) receiving announcements from other stations of unscheduled or unused time resources and decoding the information to determine TDD SP structure and information about the unoccupied time slots or SPs and a time when the channel should be free; and (d) wherein said method is performed by a processor executing instructions stored on a non-transitory medium.

18. The method of claim 17, wherein performing said receiving information on said time division duplexing (TDD) slot structure further comprises avoiding transmission or reception at times when other stations are active in transmission or reception, performing beamforming with active stations to allocate a direction of interference, estimating expected interference and determining periods with reduced chance of interference, and estimating levels of occupancy of a specific station in case direct communication is needed with that station.

19. The method of claim 17, wherein said receiving information on said time division duplexing (TDD) slot structure, further comprising determining the receiver beamformed direction affected by the interference by performing an extra signal transmitted by the interferer to help the station identify a receiver direction affected by the signal.

20. The method of claim 17, wherein said receiving information on said time division duplexing (TDD) slot structure further comprises the station accessing the channel even though a clear channel assessment (CCA) indicates that the channel is occupied if the station has determined the direction of the interference and used a different direction in transmission or reception that does not interfere with the current transmission direction of the channel.

21. An apparatus for wireless communication in a network, the apparatus comprising:

(a) a wireless communication circuit configured for wirelessly communicating with at least one other wireless communication circuit using directional communications;

(b) a processor coupled to said wireless communication circuit within a station configured for operating on a wireless network;

(c) a non-transitory memory storing instructions executable by the processor; and (d) wherein said instructions, when executed by the processor, perform steps comprising:

(i) announcing unscheduled or unused time resources to other stations in the surrounding area by the station using time division duplexing (TDD) service period (SP) allocation;

(ii) receiving announcements from other stations of unscheduled or unused time resources and decoding the information to determine TDD SP structure and information about the unoccupied time slots or SPs and a time when the channel should be free; and (iii) determining the receiver beamformed direction affected by the interference by performing an extra signal transmitted by the interferer to help the station identify the receiver direction affected by the signal.

22. An apparatus for wireless communication in a network, the apparatus comprising:

(a) a wireless communication circuit configured for wirelessly communicating with at least one other wireless communication circuit using directional communications;

(b) a processor coupled to said wireless communication circuit within a station configured for operating on a wireless network;

(c) a non-transitory memory storing instructions executable by the processor; and (d) wherein said instructions, when executed by the processor, perform steps comprising:

(i) announcing unscheduled or unused time resources to other stations in the surrounding area by the station using time division duplexing (TDD) service period (SP) allocation;

(ii) receiving announcements from other stations of unscheduled or unused time resources and decoding the information to determine TDD SP structure and information about the unoccupied time slots or SPs and a time when the channel should be free; and (iii) accessing the channel, by the station, even though a clear channel assessment (CCA) indicates that the channel is occupied if the station has determined a direction for the interference and used a different direction in transmission or reception that does not interfere with the current transmission direction of the channel.

23. An apparatus for wireless communication in a network, the apparatus comprising:

(a) a wireless communication circuit configured for wirelessly communicating with at least one other wireless communication circuit using directional communications;

(b) a processor coupled to said wireless communication circuit within a station configured for operating on a wireless network;

(c) a non-transitory memory storing instructions executable by the processor; and (d) wherein said instructions, when executed by the processor, perform steps comprising:

(i) communicating time division duplexing (TDD) slot structure comprising a TDD schedule and time when a service period (SP) is scheduled, or not scheduled, to all nodes in the surrounding area;

(ii) receiving information on said time division duplexing (TDD) slot structure allowing the station to efficiently access the channel and avoid times when it is known that other stations are accessing the channel; and (iii) accessing a directional channel even if the clear channel assessment (CCA) threshold measured using a Quasi Omni antenna is not met, because interference is detected from a different direction than the one intended for communication.

24. A method of performing wireless communication in a network, the method comprising:

(a) performing wireless communication between a station and other stations on a wireless network;

(b) announcing unscheduled or unused time resources by a station using time division duplexing (TDD) service period (SP) allocation and which is configured for wireless communication with other stations in the surrounding area on the network;
(c) receiving announcements from other stations of unscheduled or unused time resources and decoding the information to determine TDD SP structure and information about the unoccupied time slots or SPs and a time when the channel should be free; and
(d) determining the receiver beamformed direction affected by the interference by performing an extra signal transmitted by the interferer to help the station identify a receiver direction affected by the signal; and
(e) wherein said method is performed by a processor executing instructions stored on a non-transitory medium.

25. A method of performing wireless communication in a network, the method comprising:
(a) performing wireless communication between a station and other stations on a wireless network;
(b) announcing unscheduled or unused time resources by a station using time division duplexing (TDD) service period (SP) allocation and which is configured for wireless communication with other stations in the surrounding area on the network;
(c) receiving announcements from other stations of unscheduled or unused time resources and decoding the information to determine TDD SP structure and information about the unoccupied time slots or SPs and a time when the channel should be free;
(d) accessing the channel, by the station, even though a clear channel assessment (CCA) indicates that the channel is occupied if the station has determined the direction of the interference and used a different direction in transmission or reception that does not interfere with the current transmission direction of the channel; and
(e) wherein said method is performed by a processor executing instructions stored on a non-transitory medium.

* * * * *